US008041772B2

(12) United States Patent
Amanuddin et al.

(10) Patent No.: US 8,041,772 B2
(45) Date of Patent: *Oct. 18, 2011

(54) AUTONOMIC SENSOR NETWORK ECOSYSTEM

(75) Inventors: Riz S. Amanuddin, Laguna Beach, CA (US); Jonghae Kim, Fishkill, NY (US); Moon J. Kim, Wappingers Falls, NY (US); Eric C. Yee, Los Angeles, CA (US)

(73) Assignee: International Business Machines Corporation, Armonk, NY (US)

( * ) Notice: Subject to any disclaimer, the term of this patent is extended or adjusted under 35 U.S.C. 154(b) by 658 days.

This patent is subject to a terminal disclaimer.

(21) Appl. No.: 11/220,961

(22) Filed: Sep. 7, 2005

(65) Prior Publication Data

US 2007/0073861 A1    Mar. 29, 2007

(51) Int. Cl.
*G06F 15/16* (2006.01)
*G06F 15/173* (2006.01)
(52) U.S. Cl. ......... 709/208; 709/223; 709/224; 709/226
(58) Field of Classification Search .................. 70/208, 70/223, 224, 226
See application file for complete search history.

(56) References Cited

U.S. PATENT DOCUMENTS

| | | |
|---|---|---|
| 2,721,129 A | 10/1955 | Warren |
| 3,828,306 A | 8/1974 | Angeloni |
| 5,389,935 A | 2/1995 | Drouault et al. |
| 5,504,717 A | 4/1996 | Sharkey et al. |
| 5,565,858 A | 10/1996 | Guthrie |
| 5,774,876 A | 6/1998 | Woolley et al. |
| 5,804,810 A | 9/1998 | Woolley et al. |
| 6,155,292 A | 12/2000 | Kurata |
| 6,169,476 B1 | 1/2001 | Flanagan |
| 6,293,861 B1 | 9/2001 | Berry |
| 6,437,692 B1 * | 8/2002 | Petite et al. ................... 340/540 |
| 6,614,351 B2 | 9/2003 | Mann et al. |

(Continued)

FOREIGN PATENT DOCUMENTS

CN         1486453        3/2008

(Continued)

OTHER PUBLICATIONS

Younis et al. ("Optimization of Task Allocation in a Cluster-Based Sensor Network", http://ieeexplore.ieee.org/xpls/abs_all.jsp?arnumber=1214141&tag=1, 2003, pp. 1-17).*

(Continued)

*Primary Examiner* — Karen Tang
(74) *Attorney, Agent, or Firm* — William Schiesser; Hoffman Warnick LLC

(57) ABSTRACT

The present invention provides a method, system and program product for deploying and allocating resources, and addressing threats in an autonomic sensor network ecosystem. Specifically, under the present invention, the autonomic sensor network ecosystem includes a set (e.g., one or more) of sensor networks each having a set of sensor peers and at least one super peer; a set of micro grid gateways; and a set of enterprise gateways. Each micro grid gateway is typically adapted to receive requests from a sensor network, an enterprise gateway, and/or another micro grid gateway. Moreover, each micro grid gateway includes a request broker for receiving the requests; a request queue manager for queuing the requests; a scheduler for scheduling the requests; and a resource manager for monitoring the set of sensor networks.

21 Claims, 15 Drawing Sheets

U.S. PATENT DOCUMENTS

| | | | |
|---|---|---|---|
| 6,661,635 | B1 | 12/2003 | Meid |
| 6,684,137 | B2 | 1/2004 | Takagi et al. |
| 6,693,511 | B1 | 2/2004 | Seal |
| 6,795,786 | B2 | 9/2004 | LaMarca et al. |
| 6,820,210 | B1 | 11/2004 | Daruwalla et al. |
| 6,888,459 | B2 | 5/2005 | Stilp |
| 6,934,540 | B2 | 8/2005 | Twitchell, Jr. |
| 6,937,602 | B2 | 8/2005 | Whitehill et al. |
| 6,947,957 | B1 | 9/2005 | Lange |
| 7,019,639 | B2 | 3/2006 | Stilp |
| 7,081,818 | B2 | 7/2006 | Eckstein et al. |
| 7,089,099 | B2 | 8/2006 | Shostak et al. |
| 7,096,125 | B2 * | 8/2006 | Padmanabhan et al. ........ 702/24 |
| 7,200,132 | B2 | 4/2007 | Twitchell, Jr. |
| 7,212,121 | B2 | 5/2007 | Hashimoto et al. |
| 7,225,220 | B2 * | 5/2007 | Gonzalez et al. ............. 709/202 |
| 7,231,180 | B2 | 6/2007 | Benson et al. |
| 7,277,950 | B1 * | 10/2007 | Chapweske ................... 709/227 |
| 7,317,898 | B2 | 1/2008 | Tegreene |
| 7,460,549 | B1 * | 12/2008 | Cardei et al. ................. 370/408 |
| 7,475,158 | B2 | 1/2009 | Ferri et al. |
| 2002/0103907 | A1 | 8/2002 | Petersen |
| 2002/0116460 | A1 | 8/2002 | Treister et al. |
| 2002/0124081 | A1 | 9/2002 | Primm et al. |
| 2002/0161821 | A1 | 10/2002 | Narayan et al. |
| 2003/0063585 | A1 | 4/2003 | Younis et al. |
| 2003/0137415 | A1 | 7/2003 | Thomson |
| 2003/0151513 | A1 * | 8/2003 | Herrmann et al. ......... 340/573.1 |
| 2003/0212821 | A1 | 11/2003 | Gillies et al. |
| 2003/0222777 | A1 | 12/2003 | Sweatt |
| 2003/0234730 | A1 | 12/2003 | Arms et al. |
| 2004/0021582 | A1 | 2/2004 | Ohdachi et al. |
| 2004/0028023 | A1 | 2/2004 | Mandhyan et al. |
| 2004/0030507 | A1 | 2/2004 | Jung |
| 2004/0083278 | A1 | 4/2004 | Becherer |
| 2004/0153458 | A1 | 8/2004 | Noble et al. |
| 2005/0012613 | A1 | 1/2005 | Eckstein et al. |
| 2005/0060202 | A1 | 3/2005 | Taylor et al. |
| 2005/0087235 | A1 | 4/2005 | Skorpik et al. |
| 2005/0088299 | A1 | 4/2005 | Bandy et al. |
| 2005/0162270 | A1 | 7/2005 | Lambright et al. |
| 2005/0198228 | A1 | 9/2005 | Bajwa et al. |
| 2005/0212661 | A1 | 9/2005 | Friedrich |
| 2006/0025897 | A1 | 2/2006 | Shostak et al. |
| 2006/0062154 | A1 | 3/2006 | Choy et al. |
| 2006/0080819 | A1 | 4/2006 | McAllister |
| 2006/0126501 | A1 | 6/2006 | Ramaswamy |
| 2006/0181414 | A1 | 8/2006 | Bandy et al. |
| 2007/0020153 | A1 * | 1/2007 | Hyacinthe ..................... 422/124 |
| 2008/0034108 | A1 | 2/2008 | Chapweske |
| 2008/0132264 | A1 | 6/2008 | Krishnamurthy et al. |
| 2008/0198753 | A1 * | 8/2008 | Choudhury et al. .......... 370/242 |

FOREIGN PATENT DOCUMENTS

| | | | |
|---|---|---|---|
| EP | 0722141 | A2 | 7/1996 |
| EP | 0942274 | A2 | 9/1999 |
| EP | 1441320 | A1 | 7/2004 |
| FR | 2721129 | A1 | 12/1995 |
| JP | 2000315974 | A | 11/2000 |
| WO | 2006045793 | A1 | 5/2006 |

OTHER PUBLICATIONS

Stephen Childs et al, "Deployment of Grid Gateways Using Virtual Machines", Feb. 14, 2005, pp. 761-770.

Wei Cui et al, "Grid Gateway: Message-Passing Between Separated Cluster Interconnects", 2004, pp. 724-731.

Marsh, D, et al "Autonomic Wireless Sensor Networks," Oct. 2004, pp. 741-748.

Hong-Lingh Truong et al, "Self-Managing Sensor-Based Middleware for Performance Monitoring and Data Integration in Grids", Parallel and Distributed Processing Symposium, 2005, 19th IEEE International, Denver, CO.

Wise, "Integrated Microsystems: Merging MEMS, Micropower Electronics, an Wireless Communications", IEEE Xplore, 2 pages.

Sohrabi, "Protocols for Self-Organization of a Wireless Sensor Network", IEEE Personal Communications, Oct. 2000, 13 pages.

Truong, "Self-Managing Sensor-Based Middleware for Performance Monitoring and Data Integration in Grids", 19th IEEE international Parallel and Distributed Processing Symposium '05, 10 pages.

Hong, "Load Balanced, Energy-Aware Communications for MARS Sensor Networks", IEEE Xplore, Aerospace Conference Proceedings, 2002, 9 pages.

Gutierrez et al., "IEEE 802.15.4: A Developing Standard for Low-Power Low-Cost Wireless Personal Area Networks", IEEE Network, Sep./Oct. 2001, 9 pages.

Kim, U.S. Appl. No. 11/531,723, Office Action Communication, May 1, 2009, 8 pages.

Kim, U.S. Appl. No. 11/531,723, Notice of Allowance & Fees Due, Sep. 21, 2009, 8 pages.

Amanuddin, U.S. Appl. No. 10/972,610, Office Action Communication, Aug. 6, 2009, 10 pages.

Amanuddin, U.S. Appl. No. 10/972,610, Office Action Communication, Apr. 3, 2008, 16 pages.

Amanuddin, U.S. Appl. No. 10/972,610, Office Action Communication, Feb. 18, 2009, 10 pages.

Childs, "Deployment of Grid Gateways Using Virtual Machines", Department of Computer Science, Trinity College, Dublin, Ireland, 10 pages.

Amanuddin, U.S. Appl. No. 10/972,610, Office Action Communication, Feb. 8, 2010, 21 pages.

Choy, U.S. Appl. No. 10/646,714, Notice of Allowance & Fees Due, Feb. 24, 2010, 16 pages.

Ferri, U.S. Appl. No. 12/204,981 Filed Sep. 5, 2008, Office Communication dated Feb. 19, 2010, 24 pages.

Hossain, U.S. Appl. No. 10/972,610, Office Action Communication, Jul. 22, 2010, 20 pages.

Barot, U.S. Appl. No. 12/204,981, Office Action Communication, Aug. 20, 2010, 17 pages.

Ferri, U.S. Appl. No. 10/856,684, Notice of Allowance Communication, Aug. 26, 2008, 9 pages.

Ferri, U.S. Appl. No. 10/856,684, Office Action Communication, Mar. 25, 2008, 14 pages.

Choy, U.S. Appl. No. 10/946,714, Office Action Communication, Nov. 10, 2009, 15 pages.

Choy, U.S. Appl. No. 10/946,714, Office Action Communication, Apr. 8, 2009, 15 pages.

Younis, "Optimization of task allocation in a cluster-based sensor . . .," Jul. 3, 2003, 17 pages.

Boukerche, et al., "Analysis of a Randomized Congestion Control Scheme with DSDV Routin in ad Hoc Wireless Networks," Jan. 8, 2000, 29 pages.

Choi, et al., "The Mote Connectivity Protocol," 2003, 6 pages.

Hossain, Examiner's Answer for U.S. Appl. No. 10/972,610 dated Feb. 23, 2011, 18 pages.

Barot, Office Action Communication for U.S. Appl. No. 12/204,981 dated Feb. 18, 2011, 13 pages.

Kazuhiro Mizoguchi et al., "A study of Keeping of Plural Spare Routes in Ad-Hoc Network", The Institute of Electronics, Information and Communication Engineers Technical Report, vol. 103, No. 388, pp. 45-48.

Arata Toyoda et al., "Development of Novel Wireless Sensor-Network System and Its Application for Environmental Monitoring", NEC Technical Journal, vol. 57, No. 1, pp. 54-58.

Hiroshi Saito et al., IN2002-227 "Performance Metrics and its Evaluation in Sensor Networking", The Institute of Electronics, Information and Communication Engineers Technical Report, vol. 102, No. 693, pp. 129-132.

Taichi Yuki et al., "A study on Performance Improvement of TCP over an Ad Hoc Network", The Institute of Electronics, Information and Communication Engineers, vol. J85-B, No. 12, pp. 2045-2053.

Japanese Patent Application No. 2007-513914, Office Action Communication, Jul. 20, 2010, with English Translation, 3 pages.

Behringer, EP Application No. 05 747 676.4, Examination Report, CHA920040007EP1, Jun. 20, 2011, 6 pages.

Barot, U.S. Appl. No. 12/204,981, Office Action Communication, CHA920040007US2, Jun. 13, 2011, 8 pages.

* cited by examiner

AUTONOMIC SENSOR NETWORK ECOSYSTEM

CROSS-REFERENCE TO RELATED APPLICATIONS

This Application is related in some aspects to commonly assigned U.S. patent application Ser. No. 10/856,684, entitled "Wireless Sensor Network," filed May 28, 2004 and hereby incorporated by reference. This Application is also related in some aspects to commonly assigned U.S. patent application Ser. No. 10/946,714, entitled "Method, System and Program Product for Copying Data Between Nodes of a Wireless Sensor Network," filed Sep. 22, 2004 and also incorporated by reference. This Application is also related in some aspects to commonly assigned U.S. patent application Ser. No. 10/972,610, entitled "Method, System and Program Product for Deploying and Allocating an Autonomic Sensor Network Ecosystem," filed Oct. 25, 2004 and also incorporated by reference.

FIELD OF THE INVENTION

The present invention generally relates to an autonomic sensor network ecosystem. Specifically, the present invention relates to a method, system and program product for deploying resources, allocating resources and addressing threats in the autonomic sensor network ecosystem.

BACKGROUND OF THE INVENTION

In traditional computer-based storage systems, data is typically stored in sophisticated systems with layers of protections, backups systems, and encryption algorithms. The rise of wireless technologies and peer-to-peer (P2P) delivery systems is forcing the IT industry to decentralize infrastructure and its applications. Specifically, static physical infrastructures are being replaced with remote virtual environments that make traditional network, data, and applications obsolete. To this extent, even hardware supporting the traditional infrastructure is not scalable and proportional to deliver and meet the demands of P2P environment requirements. As such, conventional IT concepts are changing in an attempt to adopt a new model that provides a more scalable, and secure virtual infrastructure.

The above-incorporated patent applications all take various steps towards providing such an infrastructure. For example, U.S. patent application Ser. No. 10/856,684 (cross-referenced and incorporated above), avoids data loss by providing a wireless sensor network in which a plurality of peers/motes/nodes are interconnected (e.g., on a peer-to-peer basis). To store a data set within the network, the data set is broken up into data components, which are then stored among the nodes. Storage of the data components typically occurs by following a routing path through the network according to a routing table or the like. As the path is followed, the data components are stored among the nodes. Other examples of sensor based detection systems are described in U.S. Pat. No. 6,169,476 B1, and U.S. Pat. No. 6,293,861 B1, both of which are herein incorporated by reference.

Under U.S. patent application Ser. No. 10/946,714 (cross-referenced and incorporated above), a sensor network comprising a plurality of peer-to-peer nodes is provided. Each node in the network includes, among other things, a sensor for detecting environmental factors. When a potential failure is detected within a node, the node will query its neighboring nodes to determine whether they have the capability to store any data component(s) currently stored within the potentially failing node. Based on the querying, the data component(s) in the potentially failing node are copied to one or more of the neighboring nodes. Thereafter, details of the copying can be broadcast to other nodes in the network, and any routing tables that identify the locations of data components stored throughout the sensor network can be updated.

Under U.S. patent application Ser. No. 10/972,610 (cross-referenced and incorporated above), an autonomic sensor network ecosystem is provided. Such autonomic sensor network ecosystem includes: (1) a set (e.g., one or more) of sensor networks for storing data components; (2) a set of sensor collector information gateways in communication with the sensor networks; and (3) a set of enterprise gateways and storage hubs (hereinafter referred to as enterprise gateways) in communication with the micro grid gateway.

As advanced as these technologies have become, there still exists a need for a further evolution of the autonomic sensor network ecosystem. Specifically, a need exists for a method, system and program product for deploying (e.g. resources), allocating and addressing threats for an autonomic sensor network ecosystem.

SUMMARY OF THE INVENTION

In general, the present invention provides a method, system and program product for deploying and allocating resources, and addressing threats in an autonomic sensor network ecosystem. Specifically, under the present invention, the autonomic sensor network ecosystem includes a set (e.g., one or more) of sensor networks each having a set of sensor peers and at least one super peer; a set of micro grid gateways; and a set of enterprise gateways. Each micro grid gateway is typically adapted to receive requests from a sensor network, an enterprise gateway, and/or another micro grid gateway. Moreover, each micro grid gateway includes a request broker for receiving the requests; a request queue manager for queuing the requests; a scheduler for scheduling the requests; and a resource manager for monitoring the set of sensor networks.

A first aspect of the present invention provides an autonomic sensor network ecosystem, comprising: a set of sensor networks each comprising a set of sensor peers and at least one super peer; a set of micro grid gateways in communication with the set of sensor networks; and a set of enterprise gateways in communication with the set of micro grid gateways, wherein the set of micro grid gateways are adapted to receive and route requests from the set of sensor networks and the set of enterprise gateways.

A second aspect of the present invention provides a computer-implemented method for allocating resources in an autonomic sensor network ecosystem, comprising: receiving a request for resources on a first micro grid gateway from a first sensor network, wherein the first sensor network includes a set of sensor peers and at least one super peer; polling a second sensor network based on the request to determine available resources in the second sensor network; and allocating resources from the second sensor network to the first sensor network based on a response to the polling.

A third aspect of the present invention provides a computer-implemented method for addressing threats in an autonomic sensor network ecosystem, comprising: detecting a threat in a sensor network of the autonomic sensor network ecosystem, wherein the sensor network includes a set of sensor peers and at least one super peer; communicating a request corresponding to the threat to an enterprise gateway of the autonomic sensor network that is in communication with the sensor network; and determining available resources for at least one other sensor network to address the threat based on the request.

A fourth aspect of the present invention provides a program product stored on a computer readable medium for allocating and deploying resources in an autonomic sensor network ecosystem, the computer readable medium comprising program code for causing a computer system to perform the following steps: receiving requests from a sensor network and an enterprise gateway of the autonomic sensor network ecosystem; queuing the requests; scheduling the requests for communication between the sensor network and the enterprise gateway; monitoring the sensor network; and allocating resources based on the monitoring.

A fifth aspect of the present invention provides a method for deploying an application for allocating and deploying resources in an autonomic sensor network ecosystem, comprising: providing a computer infrastructure being operable to: receive requests from a sensor network and an enterprise gateway of the autonomic sensor network ecosystem; queue the requests; schedule the requests for communication between the sensor network and the enterprise gateway; monitor the sensor network; and allocate resources based on the monitoring.

A sixth aspect of the present invention provides computer software embodied in a propagated signal for allocating and deploying an autonomic sensor network ecosystem, the computer software comprising instructions for causing a computer system to perform the following functions: receive requests from a sensor network and an enterprise gateway of the autonomic sensor network ecosystem; queue the requests; schedule the requests for communication between the sensor network and the enterprise gateway; and monitor the sensor network and allocating resources based on the monitoring.

Therefore, the present invention provides a method, system and program product for deploying (e.g. resources), allocating and addressing threats for an autonomic sensor network ecosystem.

BRIEF DESCRIPTION OF THE DRAWINGS

These and other features of this invention will be more readily understood from the following detailed description of the various aspects of the invention taken in conjunction with the accompanying drawings in which.

Figure 1:
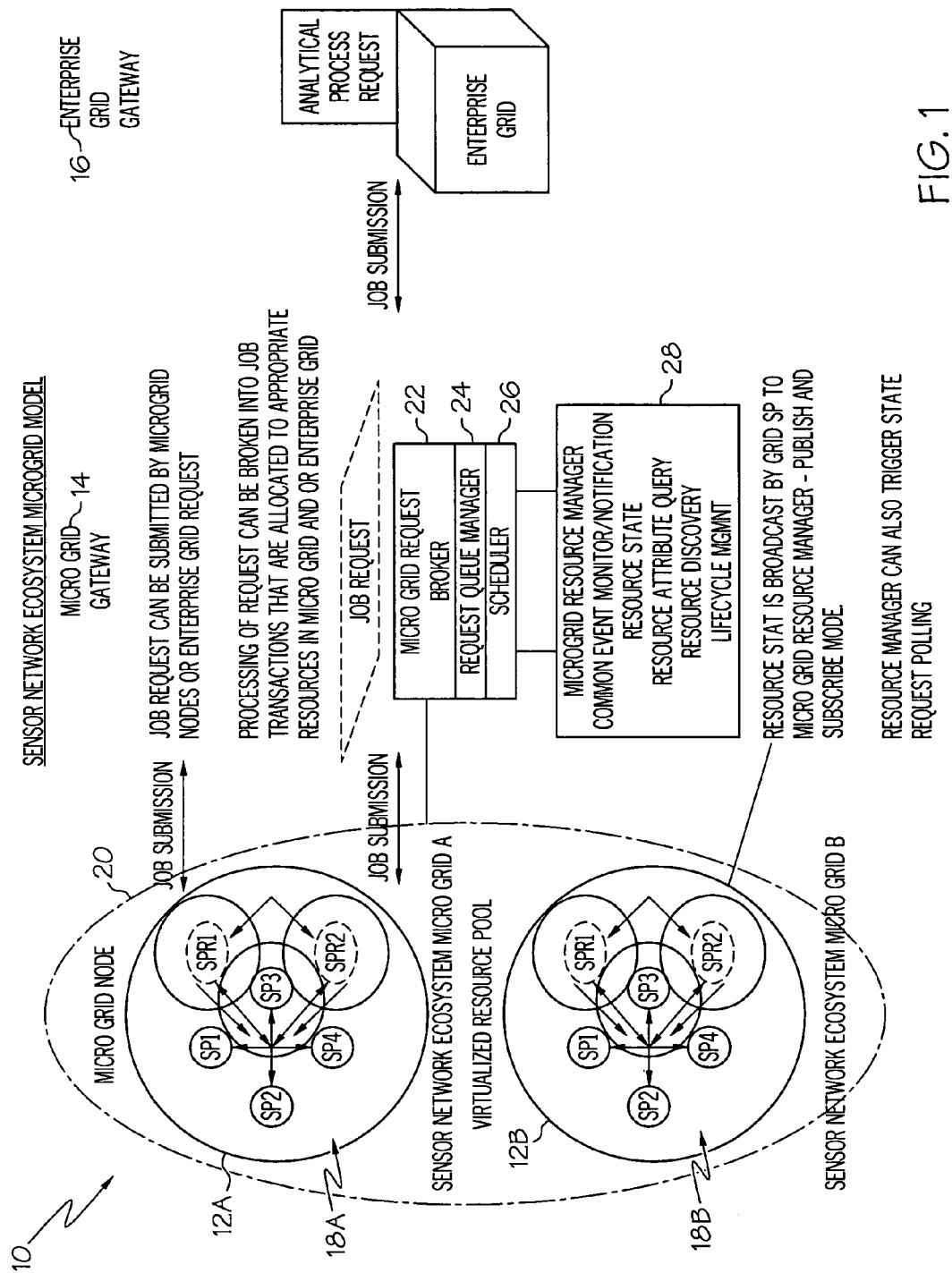
FIG. 1 depicts an autonomic sensor network ecosystem according to the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

BEST MODE FOR CARRYING OUT THE INVENTION

For convenience purposes, the Best Mode for Carrying Out the Invention will have the following sub-sections:
I. General Description
II. Deployment and Allocation
III. Illustrative Scenarios
IV. Computerized Implementation I. General Description As indicated above, the present invention provides a method, system and program product for deploying, allocating and addressing threats for an autonomic sensor network ecosystem. Specifically, under the present invention, the autonomic sensor network ecosystem includes a set (e.g., one or more) of sensor networks each having a set of sensor peers and at least one super peer; a set of micro grid gateways; and a set of enterprise gateways. Each micro grid gateway is typically adapted to receive requests from a sensor network, an enterprise gateway, and/or another micro grid gateway. Moreover, each micro grid gateway includes a request broker for receiving the requests; a request queue manager for queuing the requests; a scheduler for scheduling the requests; and a resource manager for monitoring the set of sensor networks.

Referring now to FIG. 1, an autonomic sensor network ecosystem (ecosystem) 10 according to the present invention is shown. As depicted, ecosystem 10 includes sensor/peer network(s)/micro grids 12A-B (collectively referred to as micro grid node 20), a micro grid gateway 14 and an enterprise "grid" gateway 16. It should be appreciated that two sensor networks 12A-B, one micro grid gateway 14 and one enterprise gateway 16 are shown for illustrative purposes only. However, ecosystem 10 could have any quantity thereof. Communication between sensor networks 12A-B, micro grid gateway 14 and enterprise gateway 16 can occur via a hardwired connection and/or a wireless connection. To this extent, communication typically occurs over a network such as the Internet, a local area network (LAN), a wide area network (WAN), a virtual private network (VPN), etc. Conventional network connectivity, such as Token Ring, Ethernet, WiFi or other conventional communications standards could be used. Still yet, connectivity could be provided by conventional IP-based protocol. In this instance, an Internet service provider could be used to establish interconnectivity.

In general, enterprise gateway 16 is a cluster of components that interact with micro grid gateway 14 and help balance the load of transactions being requested to or from the enterprise grid resources. Enterprise gateway 16 has the ability to reroute transactions appropriately, perform types of computational transactions, and smart prioritization of transaction requests. Enterprise gateway 16's architecture is typically ad-hoc, scalable and virtualized. Micro grid gateway 14 similarly is also a cluster of components that interact with the enterprise gateway 16 and the sensor networks 12A-B. It handles the processing of requests for computational transactions from either the sensor networks 12A-B or enterprise gateway 16, and allocates appropriately the resources to perform the task. As will be further described below, micro grid gateway 14 generally includes a request broker 22, a request queue manager 24, a scheduler 26, and a resource manager 28. The architecture, similar to the enterprise gateway 16, is ad-hoc, scalable and virtualized. Sensor networks 12A-B can be a variety of components that have computational abilities. It can also serve as smart sensors that provide monitoring and security features as outlined above. The nodes/peers 18A-B of sensor networks 12A-B are able to initiate job transactions to micro grid gateway 14 and also to enterprise gateway 16. The architecture for sensor networks 12A-B is ad-hoc, scalable, and virtualized.

As further shown in FIG. 1, sensor networks 12A-B each generally include a set of peers 18A-B comprised of a set of sensor peers (e.g., SP1-SP4) and a set of super peers (SP/R1 and SP/R2). As will be further described below, when ecosystem 10 is deployed and allocated, a data structure can be broken down into components and stored within the sensor peers SP1-SP4 of sensor networks 12A-B. Sensor networks 12A-B may be implemented in an ad-hoc or mesh network that comprises either a full mesh or partial mesh topology. In a full mesh topology, each peer 18A-B is in communication with each other peer 18A-B. In a partial mesh topology, each node is not necessarily in communication with the other nodes. While the invention is typically implemented in a wireless environment, it is recognized that some or all of the communications could be implemented using a wired technology.

In general, (as described below in conjunction with FIG. 2) peers 18A-B are configured to broadcast information (e.g., state or status information) to one another. Moreover, as will be further described below, peers 18A-B are configured to bond together (e.g., via JOIN and GATHER requests) to form sensor networks 12A-B. Super peers SP/R1 and SP/R2 are configured to manage sensor networks 12A-B, and to communicate with and/or relay information to micro grid gateway 14. Such communication/relaying can occur using push or pull (e.g., query) techniques.

Under the present invention, micro grid gateway 14 includes a micro grid request broker 22 for receiving requests from sensor networks 12A-B, enterprise gateway 16 and/or other micro grid gateways 14; a request queue broker 24 for queuing the requests, a scheduler 26 for scheduling the requests for communication between the sensor networks 12A-B and the enterprise gateway 16; and a (micro grid) resource manager 28 for monitoring sensor networks 12A-B and allocating resources based on the monitoring. In monitoring sensor networks 12A-B, resource manager 28 is operable to monitor a resource state, an attribute lifecycle, and events for sensor networks 12A-B. Resource manager 28 is also operable to provide for event notification, query sensor network 12A-B for attributes, and discover resources of sensor networks 12A-B.

In addition to depicting the actions and roles of the micro grid gateway 14, FIG. 1 shows how resources from the sensor networks 12A-B broadcast their availability to resource manager 28 (e.g., in either a publish and/or subscribe mode). To this extent, resource manager 28 can also trigger state request polling as described in more detail below. Still yet, FIG. 1, depicts the types of job submissions and requests. Specifically, as indicated above, requests can be submitted to micro grid gateway 14 by the sensor networks 12A-B or enterprise gateway 16. Processing of such requests can be broken into job transactions that are allocated to appropriate resources in sensor networks 12A-B and/or enterprise gateway 16.

Figure 2:
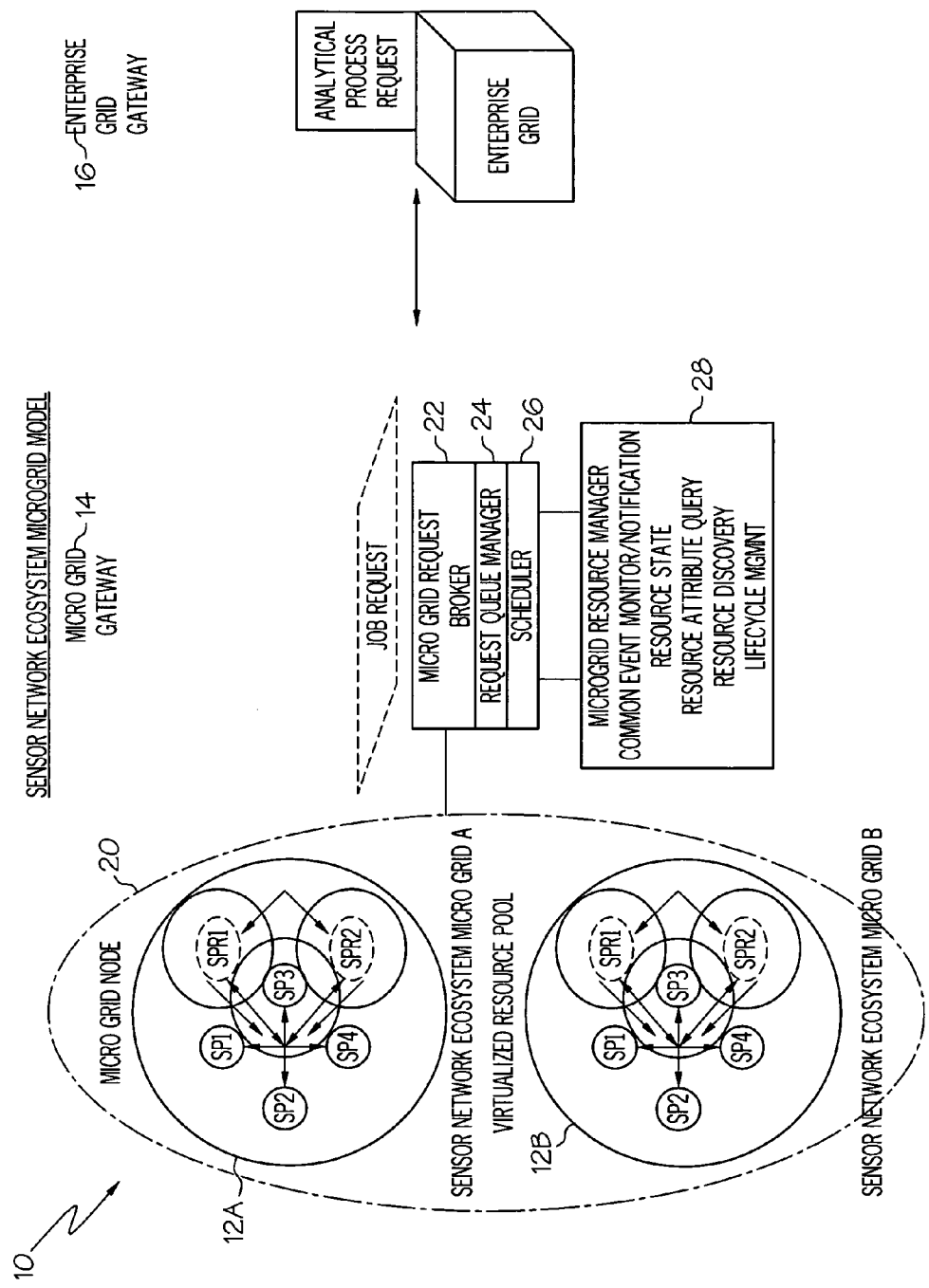
FIG. 2 depicts some underlying functionality of the autonomic sensor network ecosystem of FIG. 1.

Referring to FIG. 2, the broadcasting of resource state information under the present invention is shown. Specifically, SP/R1, SP/R2, and SP/R3 collect information from surrounding peers and relate such information to micro grid gateway 14. This information communication can occur via periodic querying (e.g., pulling) or broadcasting (e.g., pushing) from SP/R1, SP/R2, or SP/R3 about the status of monitoring from that grid. In any event, micro grid gateway 14 will communicate such information to enterprise gateway 16 for analysis. If action needs to be taken, messages (e.g., via SMS or SIP) can be sent directly to peers SP1-SP4, and SP/R1, SP/R2, and SP/R3 to conduct further actions.

Figure 3:
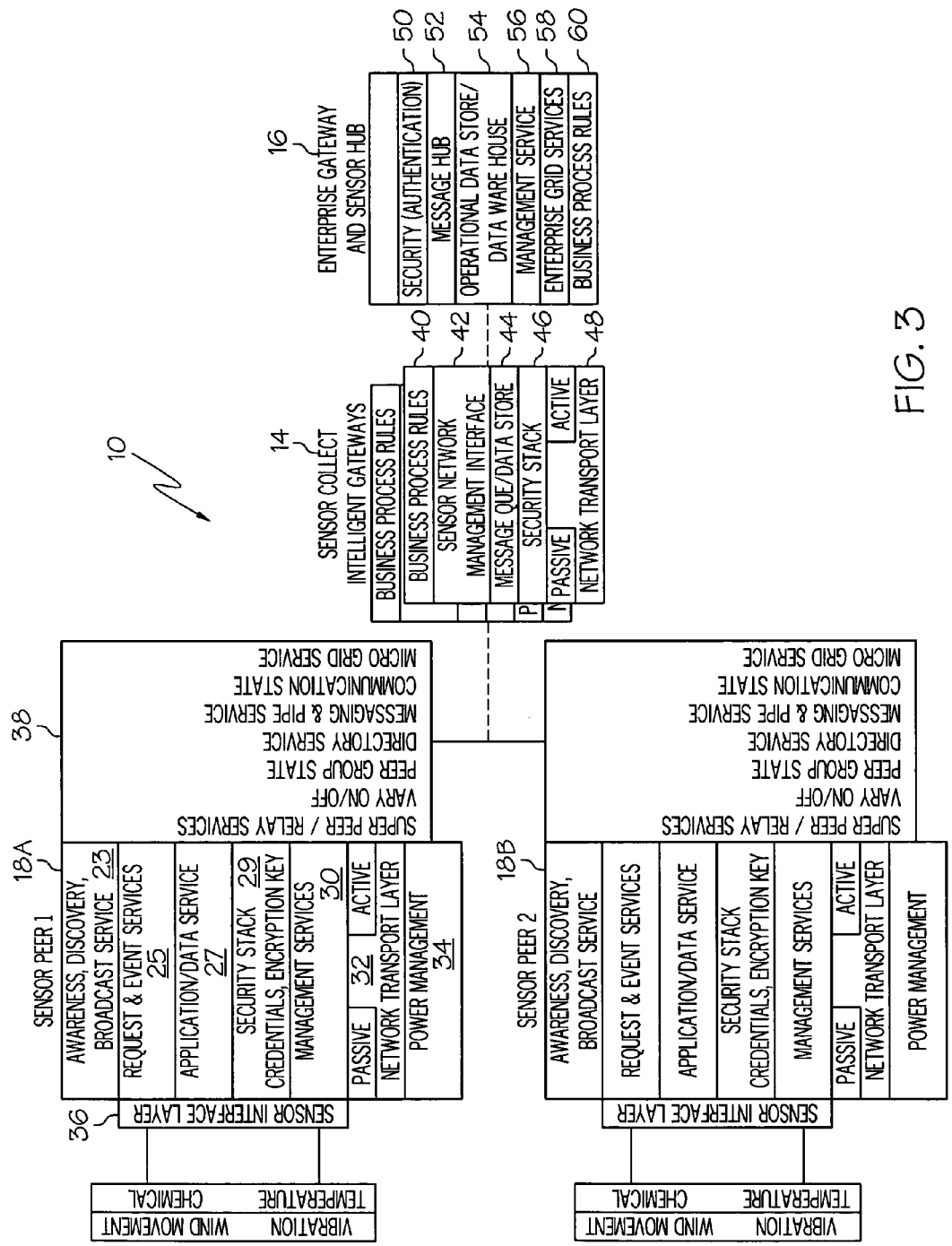
FIG. 3 depicts a detailed layer diagram of the autonomic sensor network of FIG. 1.

Referring now to FIG. 3, a more detailed stack/layer diagram of ecosystem 10 is shown. As shown, each peer includes the following layers/systems/services: (1) awareness, discovery and broadcast 23; (2) request and event 25; (3) application and data 27; (4) security stack credentials and encryption 29; (5) management 30; (6) network transport 32; (7) power management 34; (8) sensor 36; and (9) super peer/relay 38.

In general, awareness, discovery and broadcast system 23 allows peers to communicate or exchange information with one another, and bond together to form a network. As discussed in the above cross-referenced patent applications, this process can include JOIN and GATHER and requests being exchanged. Request and event services 25 provide for detection and administration of events within the sensor network. Application and data service 27 provides for the storage of data components within the peers. To this extent, application and data service 27 stores and relocates/copies data components as described in the above-incorporated patent applications. Security, stack, credentials and encryption key layer 29 provides the necessary security for the peers. Specifically, since data components will be stored therein, security is provided. Management service 30 provides for the configuring and administration of peers. Network transport layer 32 includes a passive layer and an active layer. The passive layer is used for passing or "hopping" data from one peer to another. The active layer is utilized for communicating data gathered or generated by the peer itself. Power management layer 34 may comprise an energy supply such as a solar cell. Sensor layer 36 is for sensing environmental changes (e.g., vibration, wind, chemicals and temperature) and may comprise any type of sensor or sensors that measure some environmental stimuli, including physical, chemical, or biological changes. To this extent, sensor layer 36 may collect, process and store sensed data.

As further shown, each peer 18A-B includes super peer/relay services 38. Under the present invention, each peer 18A-B is capable of becoming a super peer within the sensor network. The general role of the super peers is to gather information from the other peers, maintain a table of such peer information, and relay/communicate with micro grid gateway 14. In the event a super peer fails, another peer within the sensor network can be "promoted" to super peer status.

It should be understood that each peer 18A-B could include other systems/layers/services not depicted herein. Such systems/layers/services are shown and described in the above-incorporated patent applications. For example, each peer 18A-B could also include a local or global routing table for indicating the locations of data components stored within the sensor network, and an update system for updating the local and/or global routing tables as data components are copied/relocated among the peers (e.g., in the event of potential failure of a peer).

As further shown in FIG. 3, micro grid gateway 14 includes: (1) business process rules 40; (2) sensor network management interface 42; (3) message queue 44; (4) security stack 46; and (5) network transport layer 48. Business process rules 40 are used to guide decision-making and the general functionality of micro grid gateway 14 (e.g., selecting a peer as a super peer). Sensor network management interface 42 is the interface or communication channel between micro grid gateway 14 and the sensor networks. Message queue 44 is a queue for storing messages and communications received from and/or communicated to the sensor networks and enterprise gateway 16. Security stack 46 provides security for micro grid gateway 14, while network transport layer 48 allows for the passing/hopping of data components.

Each enterprise gateway 16 includes: (1) security layer 50; (2) message hub 52; (3) data store 54; (4) management service 56; (5) enterprise grid service 58; and (6) business process rules 60. Security layer 50 provides security for enterprise gateway 16. Message hub 52 handles all communications received on enterprise gateway 16. As shown in FIG. 3, a single enterprise gateway 16 could hold communication with multiple micro grid gateways 14. Message hub 52 helps to track all such communications. Operational data store 54 provides storage for data components. Management service 56 provides for the management of enterprise gateway 16. Enterprise grid service 58 provides for the management of ecosystem 10 as a whole. Business process rules 60 are used to guide decision-making and the general functionality of enterprise gateway 16 (e.g., recommending a course of action in response to an event within the sensor network).

Figure 4:
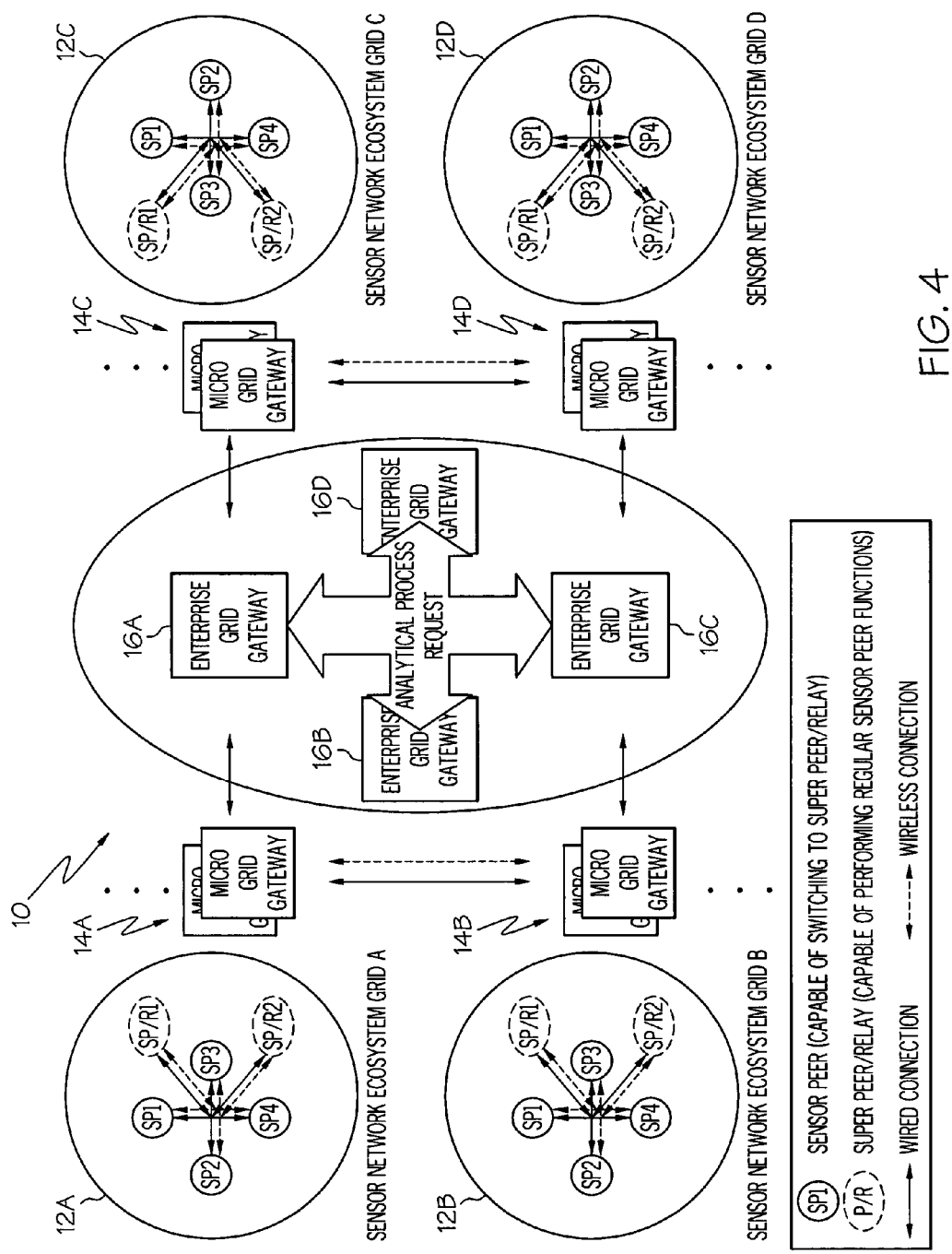
FIG. 4 depicts the autonomic sensor network ecosystem of FIG. 1 deployed in a multi-network environment.

As mentioned above, ecosystem 10 can be a multi-network environment. An example of this is shown in FIG. 4. Under the present invention, ecosystem 10 can include any quantity of sensor networks 12A-D, micro grid gateways 14A-D and enterprise gateways 16A-D. This provides optimal redundancy/resiliency in the event of failure of one or more components. As further shown, communication can occur between any of the components.

II. Deployment and Allocation

Figure 5:
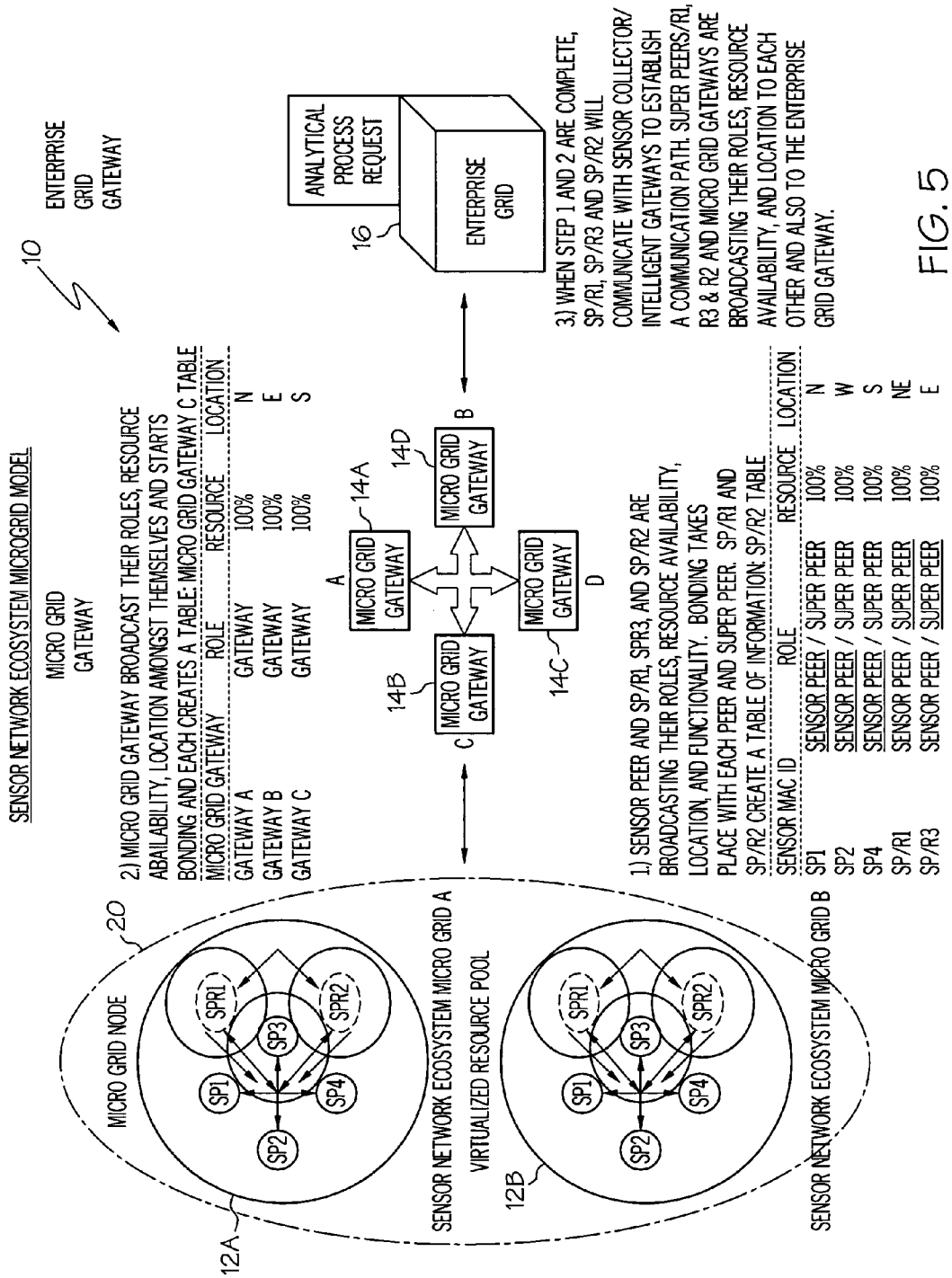
FIG. 5 depicts a diagram of the deployment and allocation of (resources of) the autonomic sensor network ecosystem of FIG. 1 and resulting data tables.

Given the above description of ecosystem 10, the process of deploying and allocating resources in ecosystem 10 will now be further described in conjunction with FIG. 5. In order to form sensor networks 12A-B, the sensor peers and super peers within sensor networks 12A-B will first broadcast peer information (e.g., via broadcast layer 23 of FIG. 3) to one another. Such information includes their roles, availabilities, locations and functionalities. Upon such communications "bonding" takes place and sensor networks 12A-B are formed.

In forming sensor networks 12A-B in this manner, the JOIN and GATHER teachings described in the above-incorporated patent applications can be followed. For example, when a peer is first powered up, its communication can be limited to a JOIN broadcast message, which essentially says, "I'd like to join a network." Thus, when sensor networks 12A-B are first activated, each peer could only broadcast a JOIN, and will not receive a response until an endpoint gets involved. Endpoints are initialized with the capability of responding to JOIN broadcasts. Namely, an Endpoint will answer all JOIN broadcasts that it can detect with a GATHER response. Thus, an Endpoint recognizes JOIN broadcasts from neighboring peers, and responds with a GATHER. As soon as a peer recognizes a GATHER, the peer can become a member of sensor network 12A-B and can stop broadcasting the JOIN. Thus, initially, the sensor networks 12A-B are comprised of the Endpoint and the Endpoint's neighboring peers. Neighboring peers may, for example, be defined as a set of nodes that can communicate with each other.

As soon as a peer establishes itself in sensor networks 12A-B, the peer can switch to a GATHER broadcast to gather its own neighbors. Thus, the cycle repeats itself, with each peer broadcasting a JOIN getting picked up as a neighbor of another nearby gathering peer (or endpoint). Again, whenever a peer becomes a neighbor within the network, it switches from JOIN to GATHER. Very quickly, all peers will become another peer's neighbor. As soon as a peer becomes a neighbor, it can collect data and send it to a neighbor. The neighbor will pass the data to its neighbor, etc., until the data makes its way back to the Endpoint. Network redundancy is established by allowing each peer to have many neighbors within the network in a manner described below.

After a short period, the entire sensor network 12A-B is established. At some point, when a peer is no longer receiving JOIN requests, a peer can determine that the sensor network 12A-B is formed. Each peer will still send out GATHERs, but at a much lower frequency, since the only new peers that would join are nodes that, for example, replace broken peers. In forming sensor networks 12A-B, super peers will be appointed (e.g., by micro grid gateway 14 A-D) from among the peers.

In any event, once sensor network 12A-B has been formed, the super peers will create and manage a table of "peer" information, which is shown below in greater detail.

| Sensor Mac ID | Role | Resource | Location |
| --- | --- | --- | --- |
| SP1 | Sensor Peer/Super Peer | 100% | N |
| SP2 | Sensor Peer/Super Peer | 100% | W |
| SP4 | Sensor Peer/Super Peer | 100% | S |
| SP/R1 | Sensor Peer/Super Peer | 100% | NE |
| SP/R3 | Sensor Peer/Super Peer | 100% | E |

As shown, for each peer, the table includes an identifier (e.g., a MAC ID), a role, a resource availability and a relative location within sensor network 12A-B. As this process is occurring, micro grid gateway 14 will broadcast gateway information similar to the peer information to one another, and bond together. Micro grid gateways 14A-D will also create a table "gateway" information that is shown below:

| Micro Grid Gateway | Role | Resource | Location |
| --- | --- | --- | --- |
| Gateway A | Gateway | 100% | N |
| Gateway B | Gateway | 100% | E |
| Gateway D | Gateway | 100% | S |

As shown, for each micro grid gateway 14A-B, the table identifies an identifier, a role, a resource availability and a relative location within the ecosystem.

Once these first two steps are completed, the super peers within sensor networks 12A-B will communicate with micro grid gateways 14A-D. During this communication the peer and gateway information (e.g., tables) will be exchanged. During the communication, micro grid gateways 14A-D can query the super peers (or be "pushed") to obtain the peer information. In either event, when this is complete, micro grid gateways 14A-D will communicate peer information and micro grid information to enterprise gateways 16A-D, which will build and maintain a table of enterprise information containing the same. At this point, ecosystem 10 has been deployed and allocated. As such, it can be used to safely store data components (as indicated in the above-incorporated patent application).

III. Illustrative Scenarios

Figure 6:
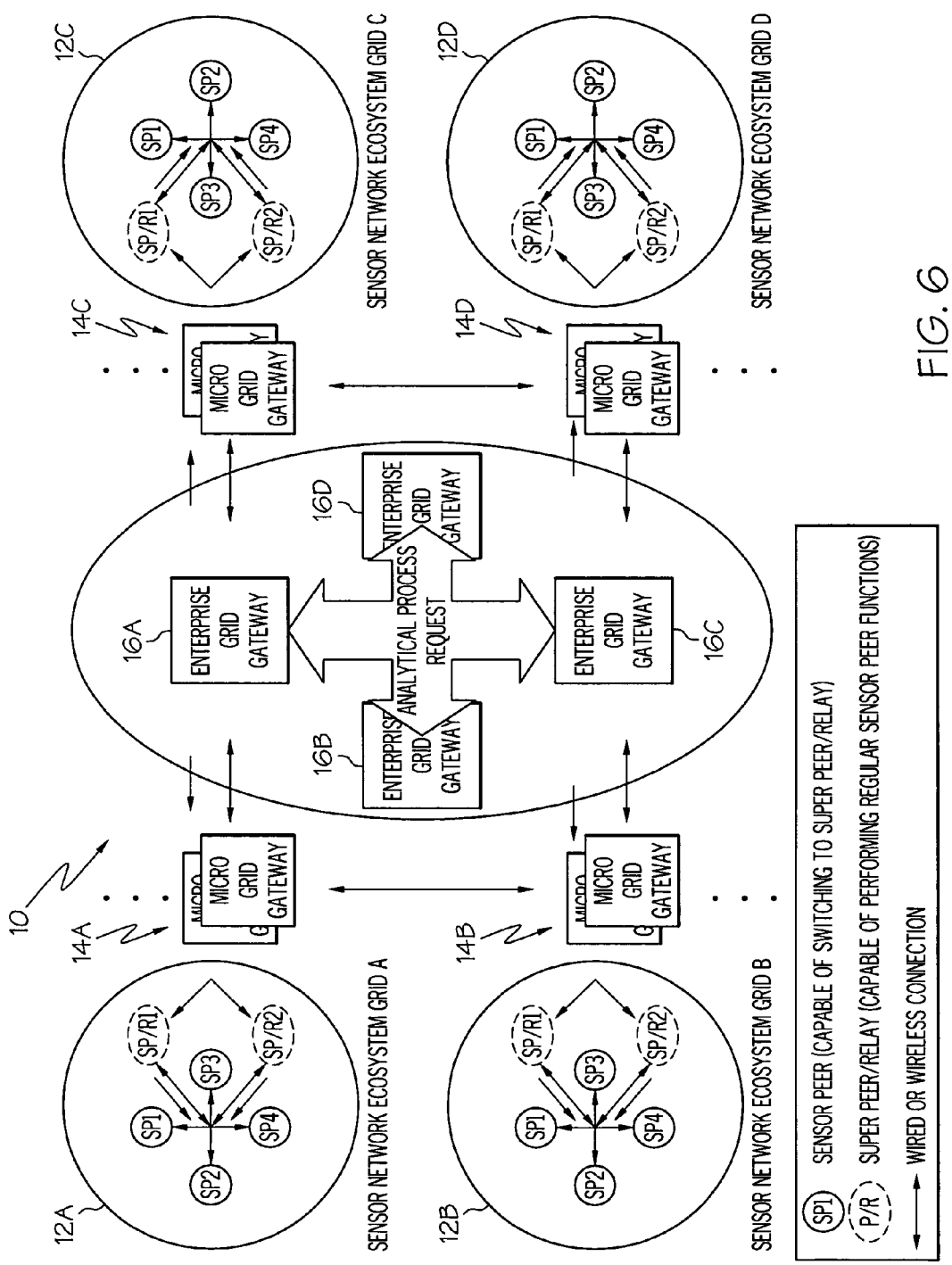
FIG. 6 depicts a first diagram of an illustrative autonomic grid computing scenario.
Figure 7:
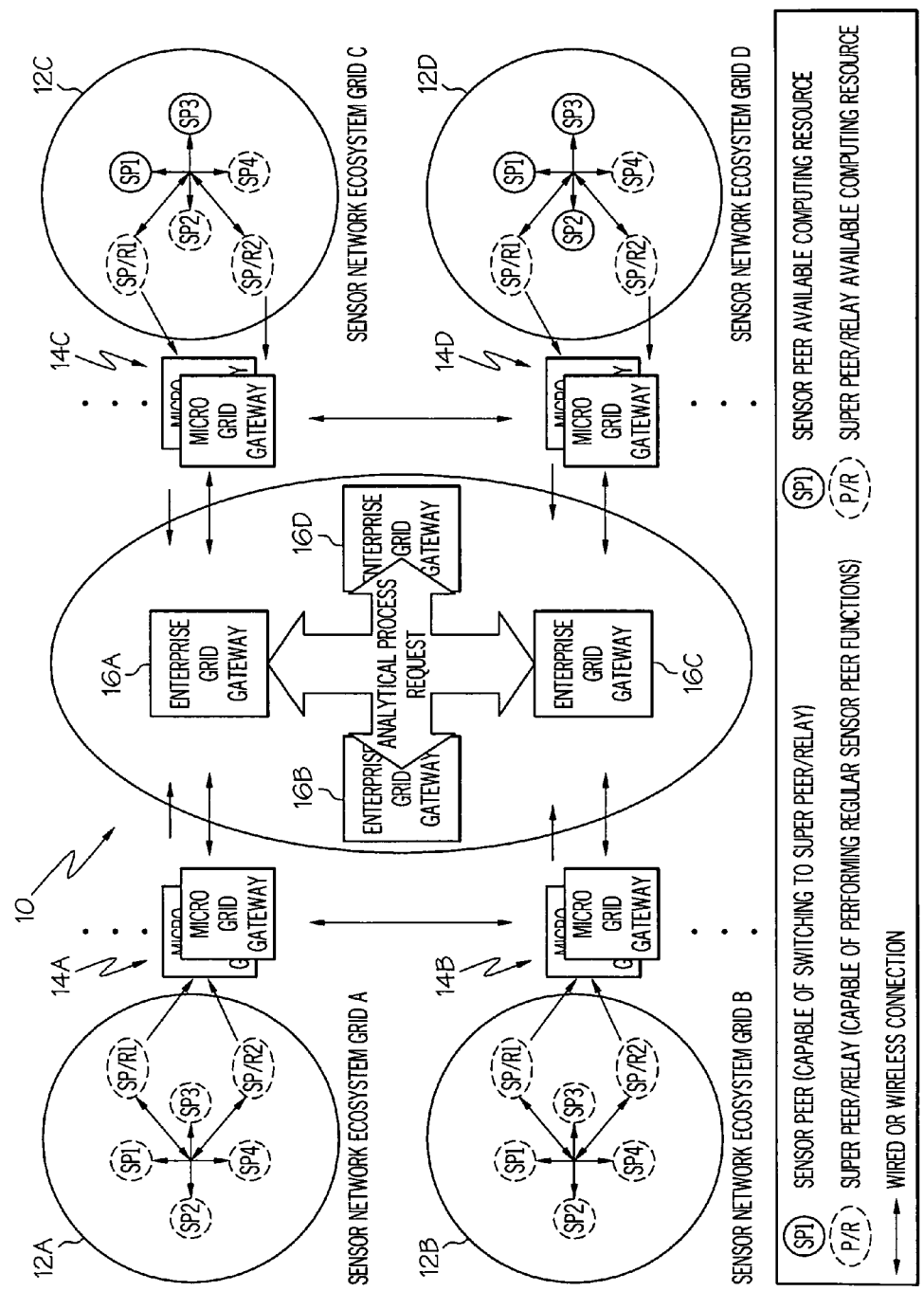
FIG. 7 depicts a second diagram of the illustrative grid computing scenario of FIG. 6.
Figure 8:
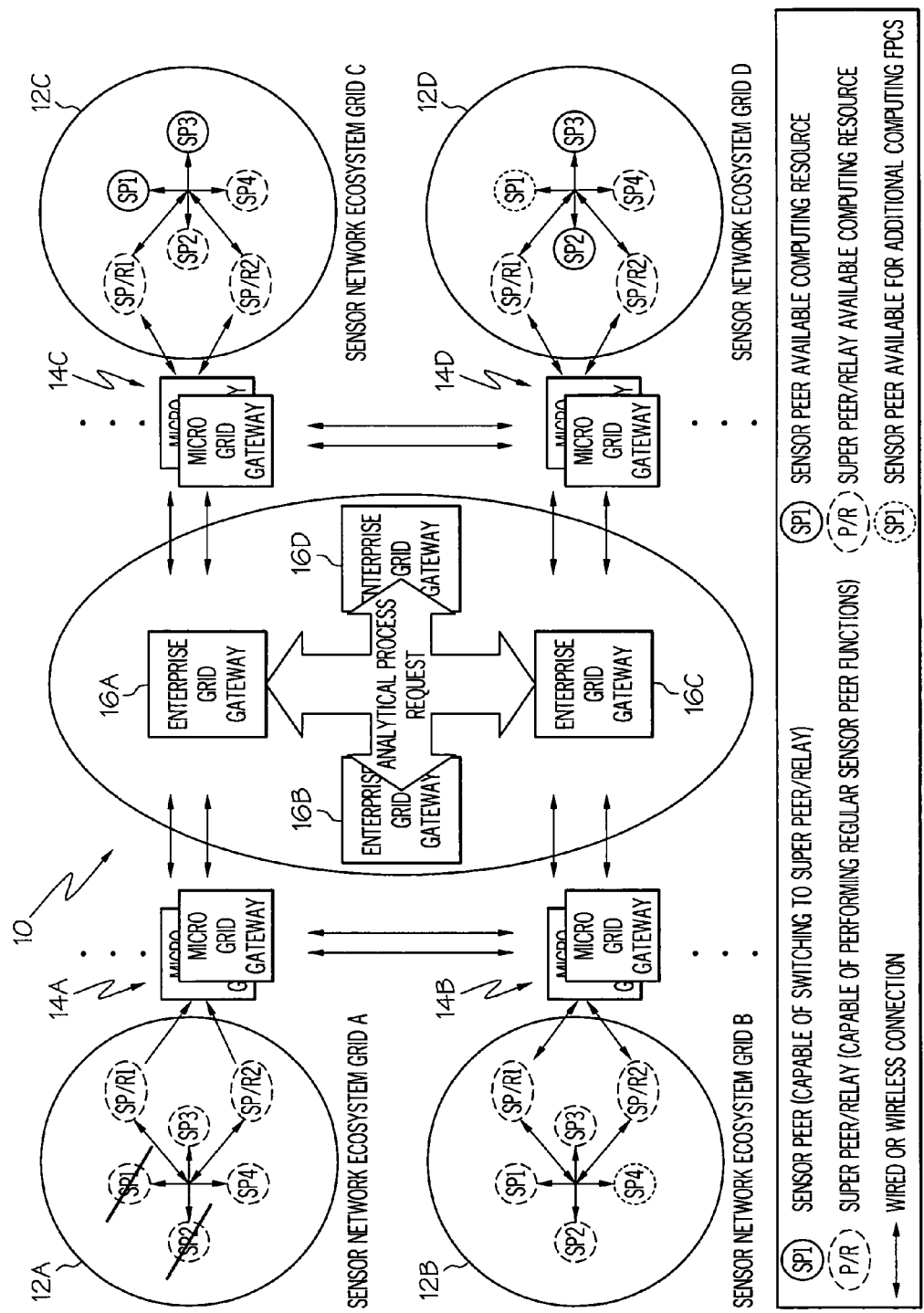
FIG. 8 depicts a third diagram of the illustrative grid computing scenario of FIG. 6.

FIGS. 6-14 will now be used to describe two illustrative scenarios in which requests are handled under the present invention. Specifically, FIGS. 6-10 correspond to a first illustrative scenario involving ecosystem 10. Referring first to FIG. 6, in a first step, a micro grid gateway 14A-D requires an analytical computation and sends out a request through its grid request broker to enterprise gateway 16A-D for computing resources available. In a second step, micro grid gateways 14A-D poll their sensor networks 12A-D to obtain available resources. In the third step shown, SP/R1 and SP/R2 of sensor networks 12A-D poll their respective peers to analyze available resources. The process is continued in FIG. 7 where in a next step SP/R1 and SP/R2 of sensor networks 12A-B relate to micro grid gateways 14A-B that all sensor peers, including themselves, are available resources with specific details, such as computational availability, memory resources, etc. Next, in this illustrative scenario, SP/R1 and SP/R2 of sensor network 12C relate to micro grid gateway 14C that SP2 & SP4 are available resources with specific details, such as computational availability, memory resources, etc., while SP1 and SP3 are not active. As this is occurring, SP/R1 and SP/R2 of sensor network 12D relate to micro grid gateway 14D that SP1, SP3, SP4, and themselves are available resources with specific details, such as computational availability, memory resources, etc., while SP2 is not active. Thereafter, an enterprise table is created depicting resources as follows:

Grid A: All active
Grid B: All active
Grid C: SP1 & SP3 not active
Grid D: SP2 not active Referring now to FIG. 8, the illustrative process is continued. In a next step, SP/R1 and SP/R2 of sensor network 12A detect failures in SP1 and SP2 and sends out a request for additional computing resources to replace them. As a result, micro grid gateways 14B-D for sensor networks 12B-D poll their respective SP/R1 & SP/R2 for resources available to perform additional computing capabilities. Assume in this example that sensor networks 12B and 12D respond with resource availability, while sensor network 12C has no resource availability.

Figure 9:
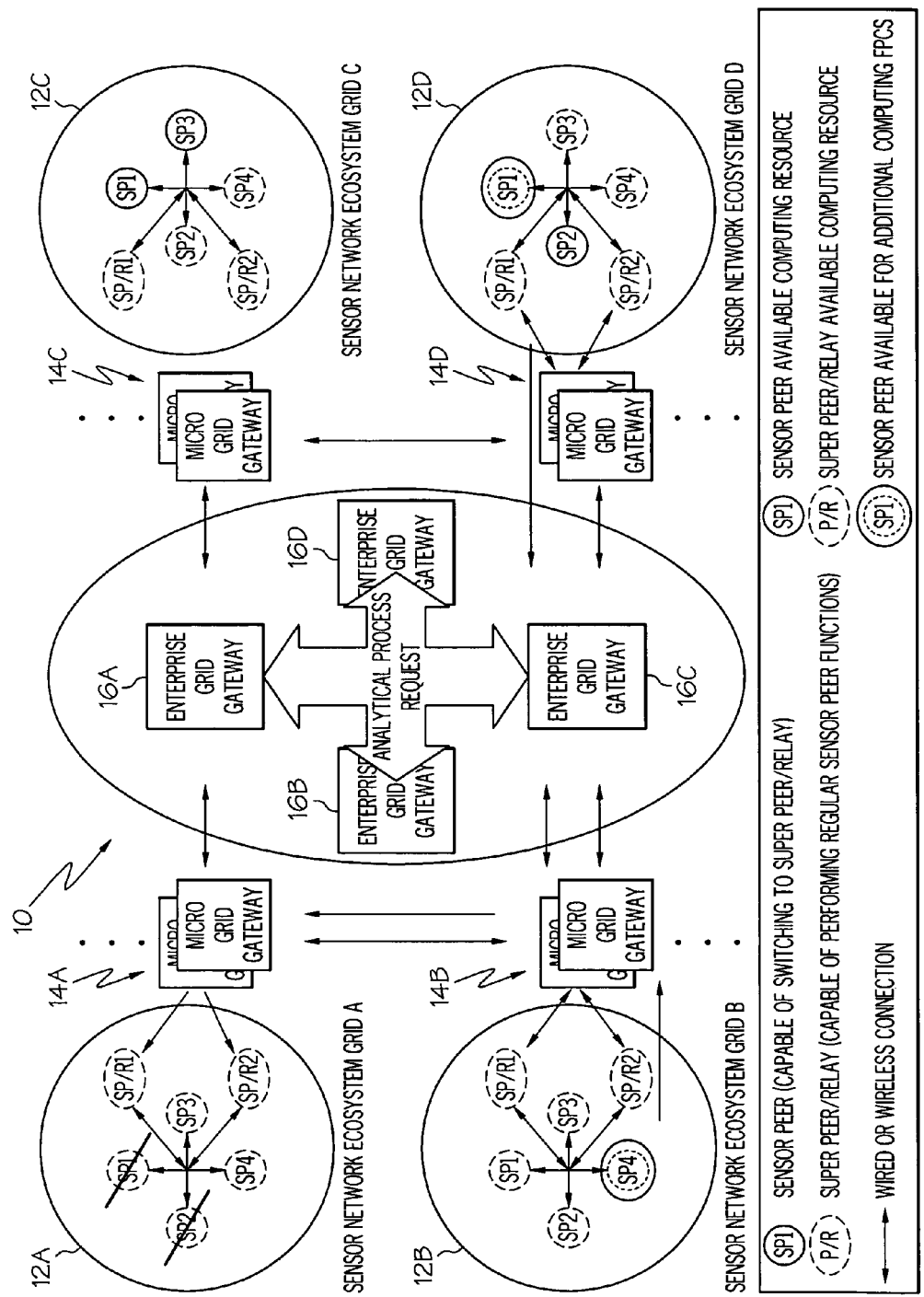
FIG. 9 depicts a fourth diagram of the illustrative grid computing scenario of FIG. 6.

Turning to FIG. 9, micro grid gateways 14B and 14D broadcast the availability of their respective sensor networks 12B and 12D. SP/R1 and SP/R2 of sensor 12 A receive this information, confirm utilizing such resources, and broadcast internally to active peers. Thereafter, enterprise gateway 16A updates the table of enterprise information to reflect the relative statuses based on the re-allocation as follows:

Grid A: SP2 & SP1 not active
Substitute Utilizing SP4 from Grid B
Substitute Utilizing SP1 from Grid D Once the table is updated, the local active sensor peers in sensor network 12A communicate to the respective sensor peers from sensor networks 12B and 12D for any dependent computational requirements.

Figure 10:
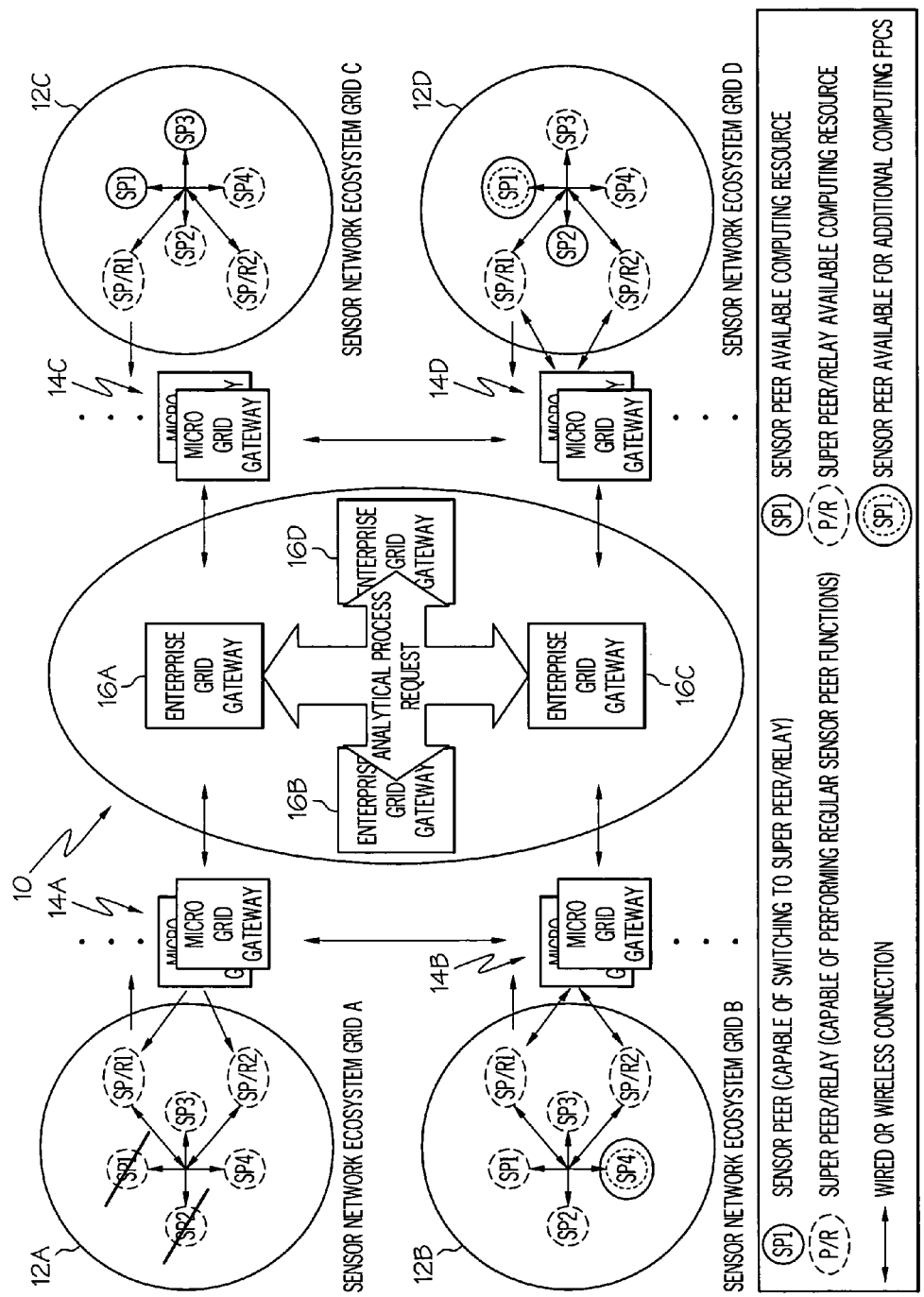
FIG. 10 depicts a fifth diagram of the illustrative grid computing scenario of FIG. 6.

The illustrative scenario is finalized in FIG. 10, in which each sensor network 12A-D completes its analytical computation and sends back corresponding information to enterprise gateways 16A-D to complete a correlation and integration for a final computation.

As can be seen in the scenario illustrated in FIGS. 6-10, communication between sensor networks 12A-D and enterprise gateways 16A-D flowed through micro grid gateways 14A-D. Furthermore, as illustrated, communication can occur between micro grid gateways 14A-D under the present invention.

Figure 11:
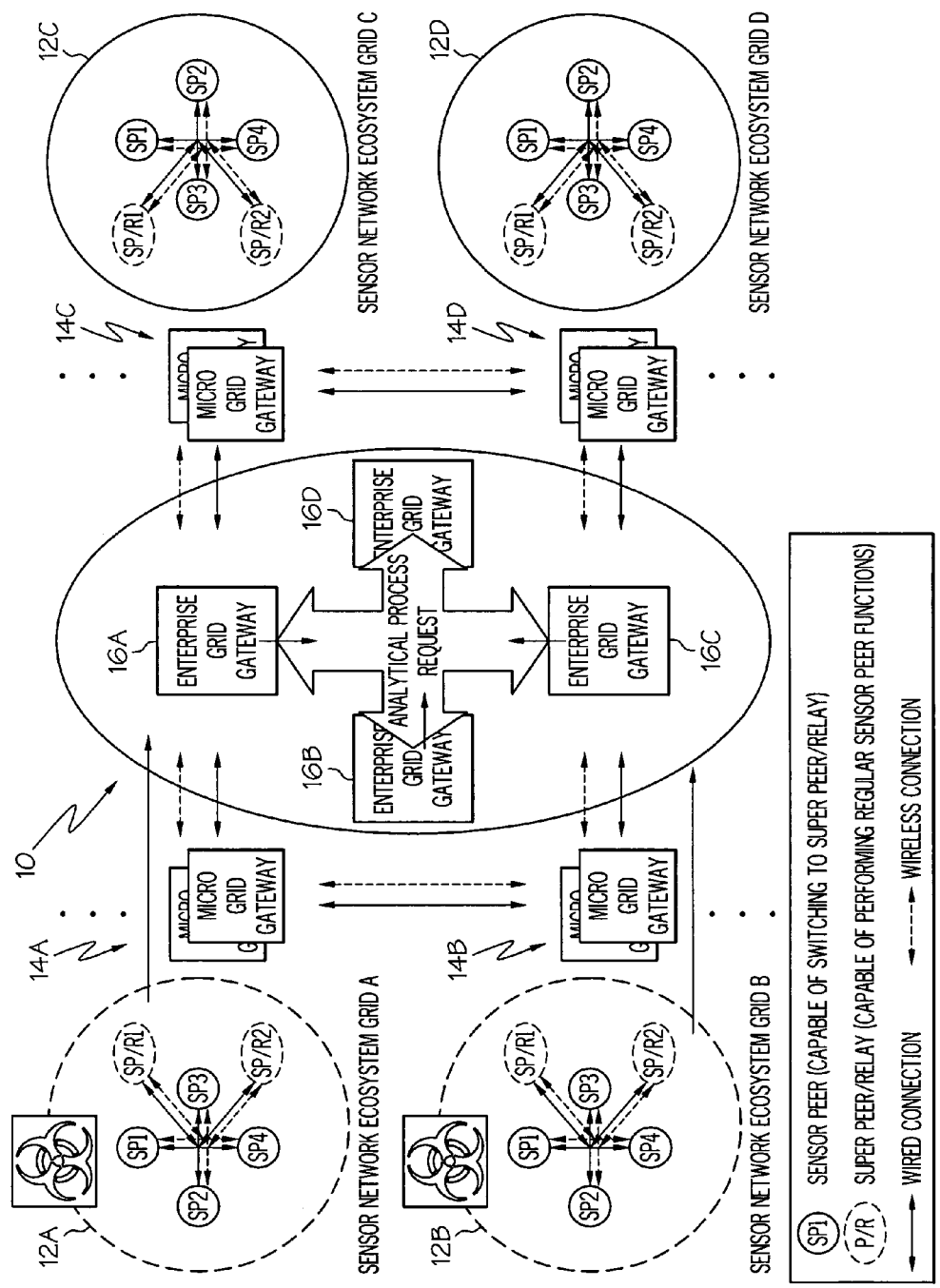
FIG. 11 depicts a first diagram of an illustrative threat addressing scenario according to the present invention.

FIGS. 11-14 illustrate a second scenario under the present invention, in which a threat to a sensor network is detected, and in which communication occurs directly between sensor networks 12A-D and enterprise gateways 16A-D. Referring first to FIG. 11, sensor peers in sensor networks 12A-B detect foreign chemical agents, and send a request to their respective micro grid gateways 14A-B for analysis. If the resources at the micro grid gateways 14A-B are unable to process and analyze the information, the requests are then forwarded to enterprise gateways 16A-B for further analysis. Assume in this example that the micro grid gateways 14A-B are in fact unable to process the requests. In such a case, enterprise gateways 16A-B will receive the original requests from sensor networks 12A-B, and summon the analytical processes needed to analyze data gathered.

Figure 12:
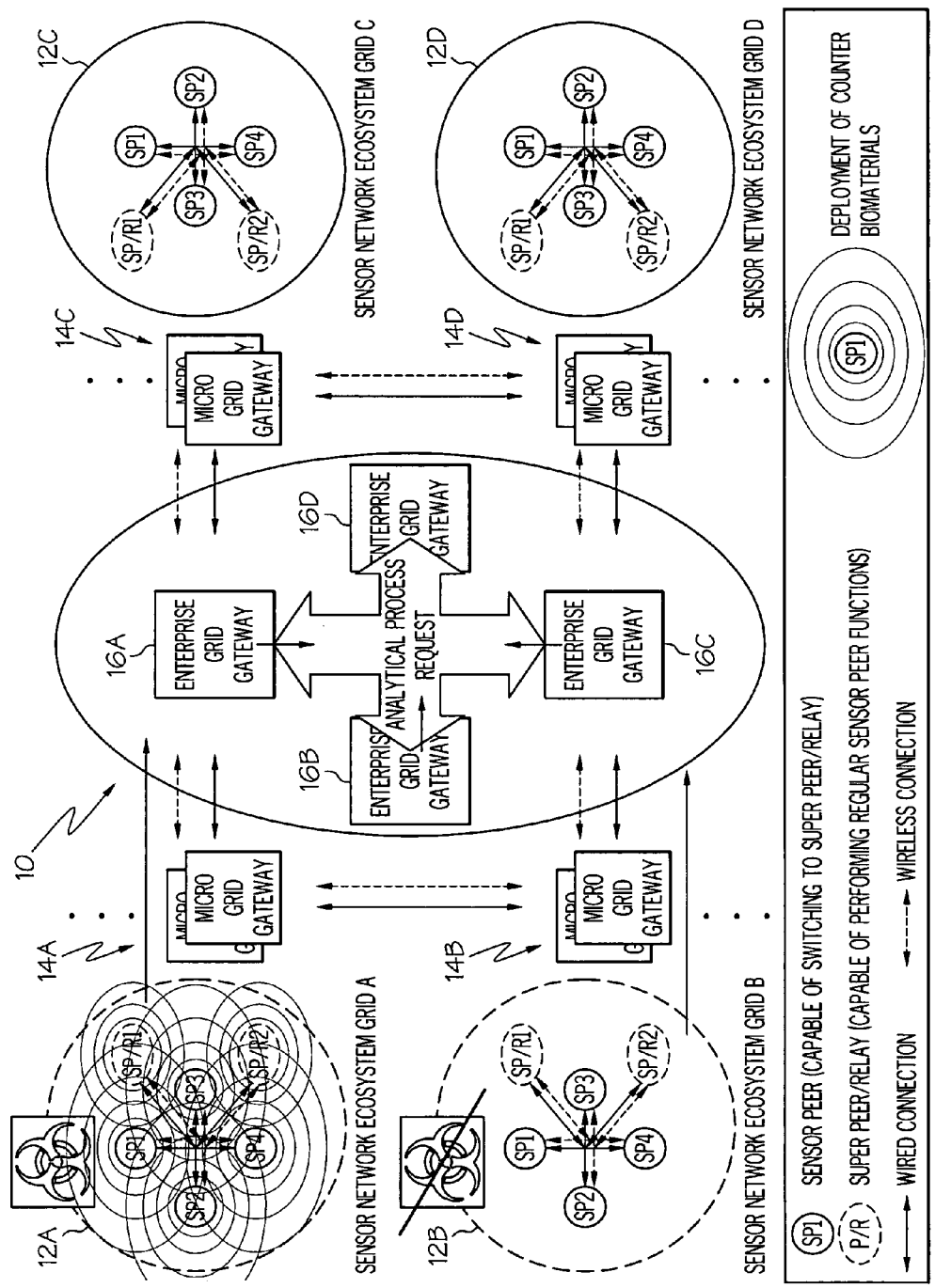
FIG. 12 depicts a second diagram of the illustrative threat addressing scenario of FIG. 11.

Referring now to FIG. 12, it is assumed that the analytical processing performed by enterprise gateways 16A-B conclude that a hazardous environment exists in sensor network 12A, and sends an immediate request for the sensor peers to deploy counter biomaterials to neutralize the environment. Conversely, the analytical processing performed by enterprise gateway 16B concludes that a safe environment exists in sensor network 12B despite the foreign chemical agent, and sends a request for the sensor peers to continue monitoring and return data back for analysis.

Figure 13:
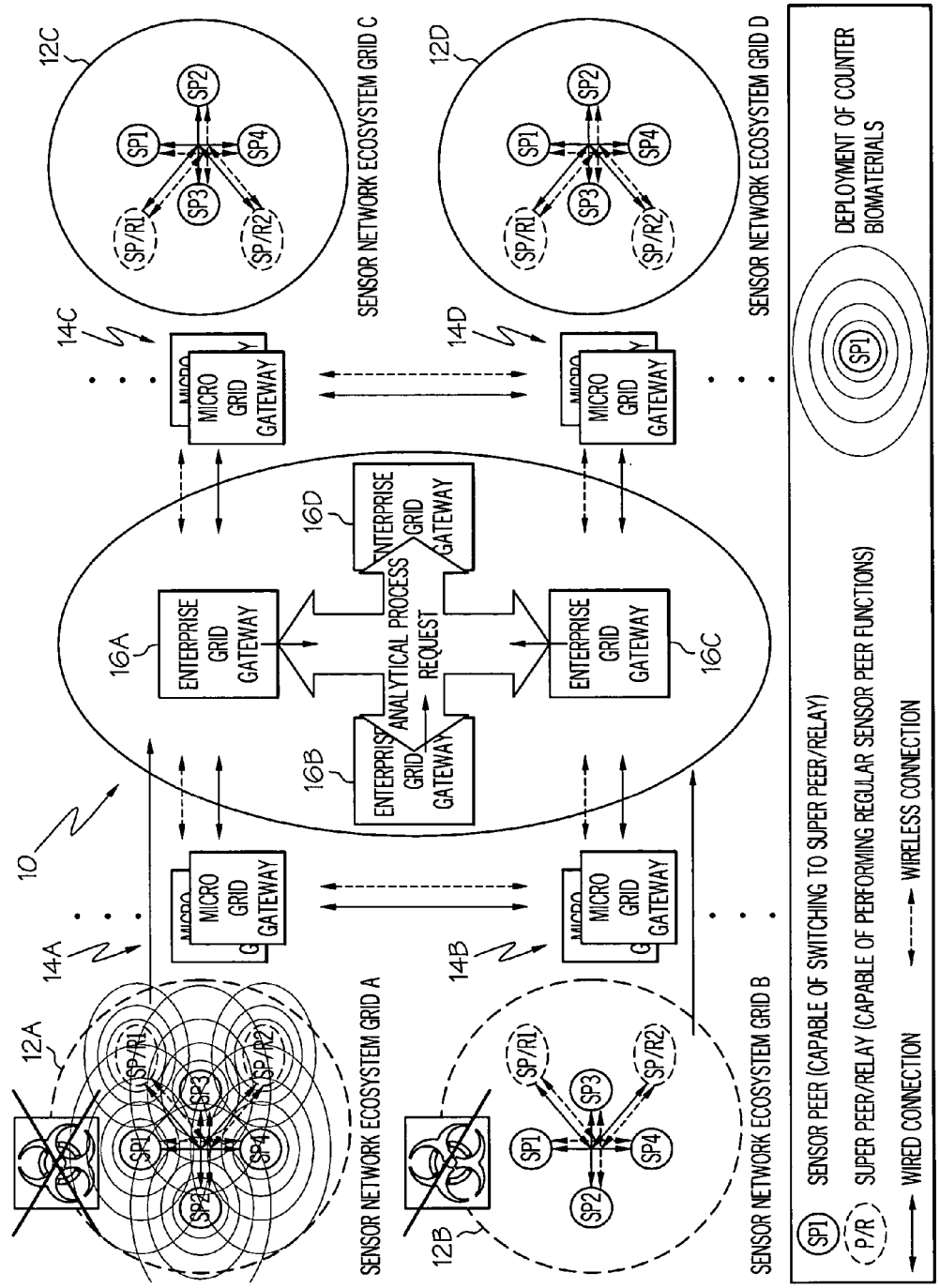
FIG. 13 depicts a third diagram of the illustrative threat addressing scenario of FIG. 11.

In FIG. 13, it can be seen that the sensor peer in sensor network 12A has contained the foreign biochemical agent but continues to send data to the enterprise gateway 16A for analytical processing. This allows enterprise gateway 16A to continue analyzing the real time data retrieved to make sure that the foreign chemical agent has been neutralized. As this is occurring, assume that the applicable sensor peer in sensor network 12B continues to send data to the enterprise gateway 16B for analytical processing to request the continued analysis of the real time data retrieved. This is to ensure that the passive foreign chemical agent is not a threat to sensor network 12B.

Figure 14:
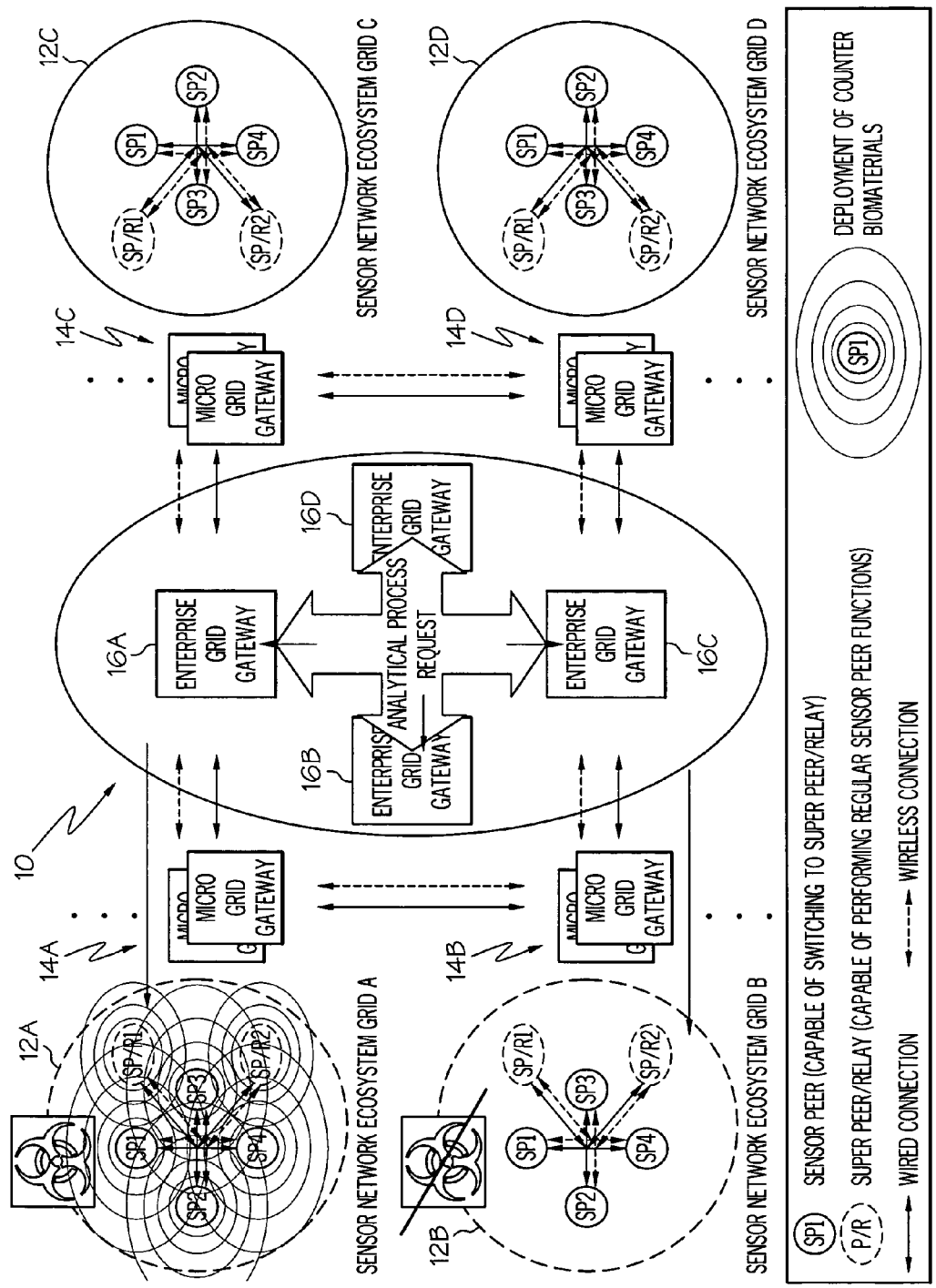
FIG. 14 depicts a fourth diagram of the illustrative threat addressing scenario of FIG. 11.

Lastly, in FIG. 14, the analytical processing of enterprise gateways 16A-B conclude, based on the data gathered, that the foreign chemical agents have been neutralized. However, enterprise gateways 16A-B continue to request data for monitoring the environment. If such monitoring concludes that there is still a threat of the foreign chemical agent, deployment of agencies are required for the next level neutralization. As further shown, the analytical process of enterprise gateway 16B still concludes that a safe environment exists in sensor network 12B. Nevertheless, enterprise gateway sends a request for the sensor peers to continue monitoring and returning data to enterprise gateway 16B for analysis.

IV. Computerized Implementation

Figure 15:
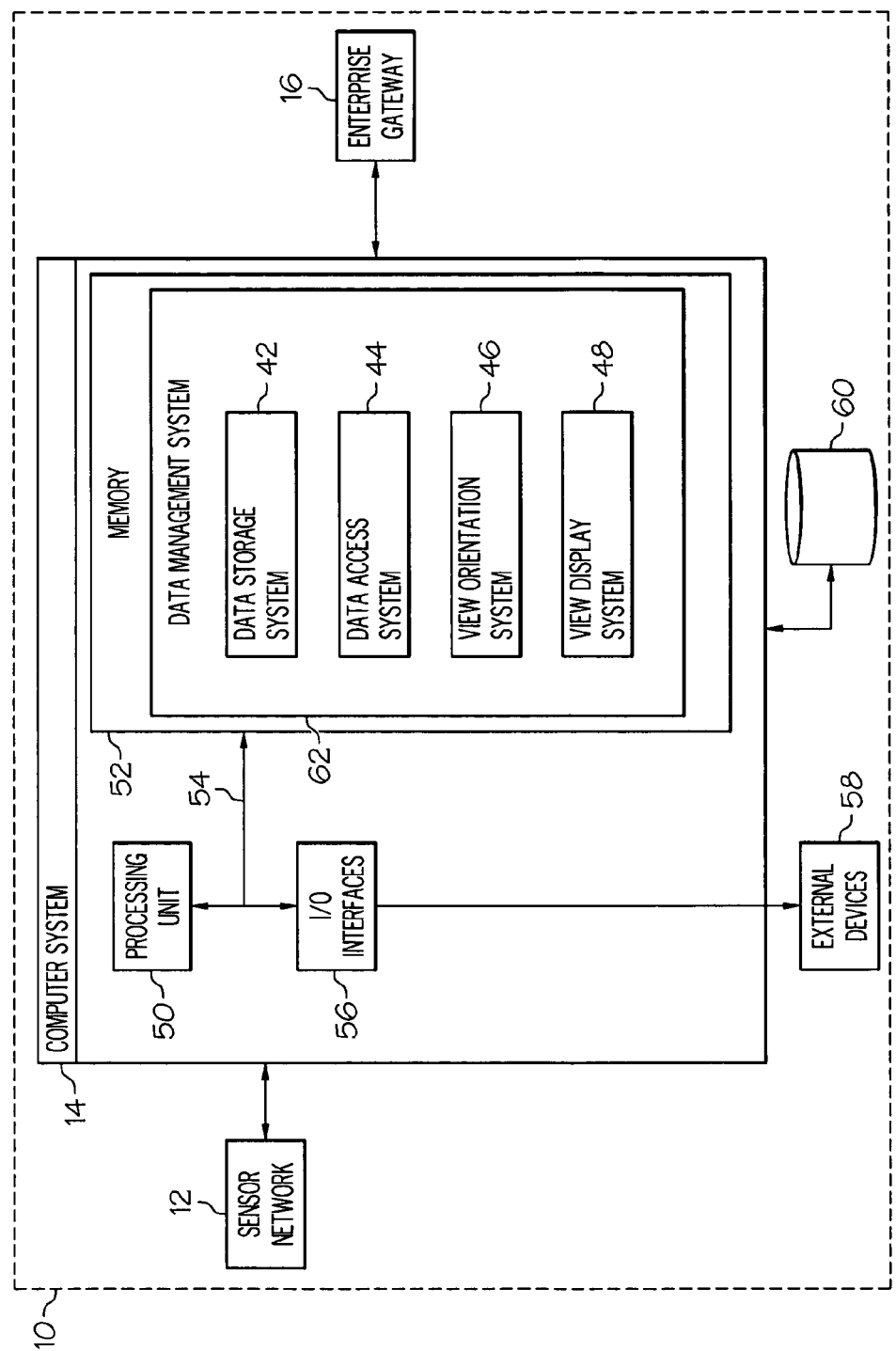
FIG. 15 depicts a more specific computerized implementation of a micro grid gateway according to the present invention.

Referring now to FIG. 15, a more detailed computerized implementation of ecosystem 10 is depicted. As indicated above, the present invention is typically implemented within a network environment (e.g., the Internet, a wide area network (WAN), a local area network (LAN), a virtual private network (VPN), etc.). Communication throughout the network can occur via any combination of various types of communications links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet. It should be understood that one or more of the components of ecosystem 10, such as micro grid gateway 14, could be deployed, managed, serviced, etc., by a service provider who offers to provide its underlying functionality for customers.

As shown, micro grid gateway 14 includes a processing unit 100, a memory 102, a bus 104, and input/output (I/O) interfaces 106. Further, micro grid gateway 14 is shown in communication with external I/O devices/resources 108 and storage system 110. In general, processing unit 100 executes computer program code, such as micro grid gateway program 112, which is stored in memory 102 and/or storage system 110. While executing computer program code, processing unit 100 can read and/or write data to/from memory 102, storage system 110, and/or I/O interfaces 106. Bus 104 provides a communication link between each of the components in micro grid gateway 14. External devices 108 can comprise any devices (e.g., keyboard, pointing device, display, etc.) that enable a user to interact with micro grid gateway 14 and/or any devices (e.g., network card, modem, etc.) that enable micro grid gateway 14 to communicate with one or more other computing devices.

Micro grid gateway 14 is only representative of various possible computer systems that can include numerous combinations of hardware and/or software. To this extent, in other embodiments, micro grid gateway 14 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively. Moreover, processing unit 100 may comprise a single processing unit, or be distributed across one or more processing units in one or more locations, e.g., on a client and server. Similarly, memory 102 and/or storage system 110 can comprise any combination of various types of data storage and/or transmission media that reside at one or more physical locations. Further, I/O interfaces 106 can comprise any system for exchanging information with one or more external devices 108. Still further, it is understood that one or more additional components (e.g., system software, math co-processing unit, etc.) not shown in FIG. 15 can be included in micro grid gateway 14. However, if micro grid gateway 14 comprises a handheld device or the like, it is understood that one or more external devices 108 (e.g., a display) and/or storage system(s) 60 could be contained within micro grid gateway 14, not externally as shown. It should also be understood that sensor network 12 and enterprise gateway 16 will likely include computerized components similar to micro grid gateway 14.

Storage system 110 can be any type of system (e.g., a database) capable of providing storage for information under the present invention, such as tables of information, requests, etc. To this extent, storage system 110 could include one or more storage devices, such as a magnetic disk drive or an optical disk drive. In another embodiment, storage system 110 includes data distributed across, for example, a local area network (LAN), wide area network (WAN) or a storage area network (SAN) (not shown). Although not shown, additional components, such as cache memory, communication systems, system software, etc., may be incorporated into micro grid gateway 14.

Shown in memory 102 of micro grid gateway 14 is micro grid gateway program 112, which is a software program that will provide the functions of the present invention, and which includes micro grid request broker 22 for receiving requests from sensor network 12, enterprise gateway 16 and/or other micro grid gateways 14; request queue broker 24 for queuing the requests; scheduler 26 for scheduling the requests for communication between the sensor network 12 and the enterprise gateway 16; and (micro grid) resource manager 28 monitor sensor network 12 and allocating resources based on the monitoring. In monitoring sensor network 12, resource manager 28 is operable to monitor a resource state, an attribute lifecycle, and events for sensor network 12. Resource manager 28 is also operable to provide for event notification, query sensor network 12 for attributes, and discover resources of sensor network 12.

While shown and described herein as a method, system and program product for deploying resources, allocating resources and addressing threats for an autonomic sensor network ecosystem, it is understood that the invention further provides various alternative embodiments. For example, in one embodiment, the invention provides a computer-readable/useable medium that includes computer program code to enable a computer infrastructure perform the functions of the present invention. To this extent, the computer-readable/useable medium includes program code that implements each of the various process steps of the invention. It is understood that the terms computer-readable medium or computer useable medium can comprise one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory 102 (FIG. 15) and/or storage system 110 (FIG. 15) (e.g., a fixed disk, a read-only memory, a random access memory, a cache memory, etc.

In another embodiment, the invention provides a business method that performs the process steps of the invention on a subscription, advertising, and/or fee basis. That is, a service provider, such as a Solution Integrator, could offer to deploy, allocate and address threats for an autonomic sensor network ecosystem. In this case, the service provider can create, maintain, support, etc., a computer infrastructure that performs the process steps of the invention for one or more customers. In return, the service provider can receive payment from the customer(s) under a subscription and/or fee agreement and/or the service provider can receive payment from the sale of advertising content to one or more third parties.

In still another embodiment, the invention provides a computer-implemented method for deploying, allocating and addressing threats for an autonomic sensor network ecosystem. In this case, a computer infrastructure can be provided and one or more systems for performing the process steps of the invention can be obtained (e.g., created, purchased, used, modified, etc.) and deployed to the computer infrastructure. To this extent, the deployment of a system can comprise one or more of (1) installing program code on a computing device, such as micro grid gateway 14 (FIG. 15), from a computer-readable medium; (2) adding one or more computing devices to the computer infrastructure; and (3) incorporating and/or modifying one or more existing systems of the computer infrastructure to enable the computer infrastructure to perform the process steps of the invention.

As used herein, it is understood that the terms "program code" and "computer program code" are synonymous and mean any expression, in any language, code or notation, of a set of instructions intended to cause a computing device having an information processing capability to perform a particular function either directly or after either or both of the following: (a) conversion to another language, code or notation;

and/or (b) reproduction in a different material form. To this extent, program code can be embodied as one or more of: an application/software program, component software/a library of functions, an operating system, a basic I/O system/driver for a particular computing and/or I/O device, and the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

We claim:

1. An autonomic sensor network ecosystem, comprising:
   a set of sensor networks each comprising a set of sensor peers and at least one super peer;
   every sensor peer in the set of sensor peers configured to create peer information for the sensor peer, wherein the peer information comprises an identifier, a role, a resource availability, a relative location within the sensor network and physical data about a physical environment of the sensor peer, wherein the resource availability includes computational ability or memory resources of the sensor peer;
   the at least one super peer configured to collect the peer information from each sensor peer, maintain a table of the peer information corresponding to each sensor peer, and relate the peer information to a set of micro grid gateways;
   the set of micro grid gateways in communication with the set of sensor networks, each micro grid gateway configured to create gateway information for the micro grid gateway, wherein the gateway information comprises an identifier, a role, a resource availability and a relative location for each sensor network within the sensor network ecosystem and wherein the resource availability includes computational ability or memory resources of each gateway; and
   a set of enterprise gateways in communication with the set of micro grid gateways, wherein the set of micro grid gateways are adapted to poll the set of sensor networks for available resources and receive requests for computational transactions from the set of sensor networks and the set of enterprise gateways and route the requests based on the role of each sensor peer, the resource availability of each sensor peer, the physical data about the physical environment of each sensor peer, the relative location of each sensor peer within the sensor network and the gateway information.

2. The autonomic sensor network ecosystem of claim 1, wherein each of the set of micro grid gateways comprises:
   a request broker for receiving the requests;
   a request queue manager for queuing the requests;
   a scheduler for scheduling the requests; and
   a resource manager for monitoring the set of sensor networks.

3. The autonomic sensor network ecosystem of claim 2, wherein the resource manager monitors a resource state, an attribute lifecycle, and events for the set of sensor networks.

4. The autonomic sensor network ecosystem of claim 1, wherein the set of micro grid gateways receive requests from the set of sensor networks and forward the requests to the set of enterprise gateways.

5. The autonomic sensor network ecosystem of claim 1, wherein the set of micro grid gateways receive requests from the set of enterprise gateways and forward the requests to the set of sensor networks.

6. The autonomic sensor network ecosystem of claim 1, wherein the set of enterprise gateways communicate directly with the set of sensor networks.

7. The autonomic sensor network ecosystem of claim 1, wherein each of the set of enterprise gateways comprises a cluster of components that determines actions to be taken with respect to the set of sensor networks.

8. The autonomic sensor network ecosystem of claim 1, wherein the set of sensor networks comprises a plurality of sensor peers, wherein the set of micro grid gateways comprises a plurality of micro grid gateways, and wherein the set of enterprise gateways comprises a plurality of enterprise gateways.

9. The autonomic sensor network ecosystem of claim 1, wherein the set of sensor peers and at least one super peer broadcast to one another, and wherein the at least one super peer creates a table of peer information based on the broadcast.

10. The autonomic sensor network ecosystem of claim 1, wherein the set of micro grid gateways broadcast to one another, and wherein the set of micro grid gateways create a table of gateway information based on the broadcast.

11. A computer-implemented method for allocating resources in an autonomic sensor network ecosystem, comprising:
    receiving a request for resources on a first micro grid gateway from a first sensor network, wherein the first sensor network includes a set of sensor peers and at least one super peer; every sensor peer in the set of sensor peers configured to create peer information for the sensor peer, wherein the peer information comprises an identifier, a role, a the resource availability, a relative location with the sensor network and physical data about a physical environment of the sensor peer, wherein the resource availability includes computational ability or memory resources of the sensor peer; the at least one super peer configured to collect the peer information from each sensor peer, maintain a table of the peer information from each sensor peer, and relate the peer information to the first micro grid gateway;
    polling the first sensor network to determine available resources for computational transactions in the first sensor network;
    polling a second sensor network based on a request to determine available resources for computational transactions in the second sensor network; and
    allocating resources from the second sensor network to the first sensor network based on a response to the polling of the first and second sensor networks, the role of each sensor peer, the resource availability of each sensor peer, the physical data about the physical environment of each sensor peer and the relative location of each sensor peer within the sensor network.

12. The computer-implemented method of claim 11, further comprising communicating the request to an enterprise gateway from the first micro grid gateway prior to the polling step, wherein the polling is conducted from the enterprise gateway, and wherein the response is received on the enterprise gateway and is communicated to the first micro grid gateway.

13. The computer-implemented method of claim 11, further comprising communicating the request from the first micro grid gateway to a second micro grid gateway prior to the polling step, wherein the polling is conducted from second micro grid gateway, and wherein the response is received on the second micro grid gateway and is communicated to the first micro grid gateway.

14. The computer-implemented method of claim 11, further comprising updating an enterprise table that contains sensor network statuses based on the allocating.

15. A computer-implemented method for addressing threats in an autonomic sensor network ecosystem, comprising:
- detecting a threat in a sensor network of the autonomic sensor network ecosystem, wherein the sensor network includes a set of sensor peers and at least one super peer; every sensor peer in the set of sensor peers collecting physical data about a physical environment of the sensor peer to detect a threat to the sensor peer, wherein the threat includes a foreign chemical agent; the at least one super peer configured to collect peer information from each sensor peer, maintain a table of the peer information from each sensor peer, and relate the peer information to the first micro grid gateways wherein the peer information comprises an identifier, a role, a resource availability and a relative location with the sensor network, wherein the resource availability includes computational ability or memory resources of each sensor peer;
- communicating a request to analyze the threat to the sensor peer to an enterprise gateway of the autonomic sensor network that is in communication with the sensor network;
- determining whether a hazardous environment exists in the sensor network based on the analysis;
- determining available resources for at least one other sensor network to address the threat to the sensor peer based on the request and the resource availability of each sensor peer; and
- sending a request to at least one sensor peer to address the threat by deploying counter biomaterials to neutralize the foreign chemical agent.

16. The computer-implemented method of claim 15, further comprising receiving the request on a micro grid gateway from the sensor network, wherein the communicating step comprises communicating the request from the micro grid gateway to the enterprise gateway.

17. The computer-implemented method of claim 15, wherein the determining step comprises polling the at least one other sensor network for the available resources, and wherein the method further comprises:
- receiving a response from each of the at least one other sensor networks on the enterprise gateway; and
- allocating resources away from at least one sensor network to address the threat based on the response.

18. A program product stored on a computer readable medium for allocating and deploying resources in an autonomic sensor network ecosystem, the computer readable medium comprising program code for causing a computer system to perform the following steps:
- receiving requests from a sensor network and an enterprise gateway of the autonomic sensor network ecosystem; wherein the sensor network includes a set of sensor peers and at least one super peer; every sensor peer in the set of sensor peers configured to create peer information for the sensor peer, wherein the peer information comprises an identifier, a role, a resource availability, a relative location within the sensor network and physical data about a physical environment of the sensor peer, wherein the resource availability includes computational ability or memory resources of the sensor peer; the at least one super peer configured to collect peer information from each sensor peer, maintain a table of the peer information from each sensor peer, and relate the peer information to the first micro grid gateway;
- queuing the requests;
- scheduling the requests for communication between the sensor network and the enterprise gateway;
- monitoring the sensor network to determine available resources for computational transactions in the sensor network; and
- allocating resources based on the monitoring, the role of each sensor peer, the resource availability of each sensor peer, the physical data about the physical environment of each sensor peer and the relative location of each sensor peer within the sensor network.

19. The program product of claim 18, wherein the monitoring step comprises monitoring a resource state, an attribute lifecycle, and events for the sensor network.

20. A method for deploying an application for allocating and deploying resources in an autonomic sensor network ecosystem, comprising:
- providing a computer infrastructure being operable to:
  - receive requests from a sensor network and an enterprise gateway of the autonomic sensor network ecosystem; wherein the sensor network includes a set of sensor peers and at least one super peer; every sensor peer in the set of sensor peers configured to create peer information for the sensor peer, wherein the peer information comprises an identifier, a role, a resource availability, a relative location within the sensor network and physical data about a physical environment of the sensor peer, wherein the resource availability includes computational ability or memory resources of the sensor peer; the at least one super peer configured to collect peer information from each sensor peer, maintain a table of the peer information from each sensor peer, and relate the peer information to the first micro grid gateway;
  - queue the requests;
  - schedule the requests for communication between the sensor network and the enterprise gateway;
  - monitor the sensor network to determine available resources for computational transactions in the sensor network; and
  - allocate resources based on the monitoring, the role of each sensor peer, the resource availability of each sensor peer, the physical data about the physical environment of each sensor peer and the relative location of each sensor peer within the sensor network.

21. The method of claim 20, wherein the computer infrastructure is operable to monitor a resource state, an attribute lifecycle, and events for the sensor network.

* * * * *